United States Patent
Tosen et al.

(10) Patent No.: US 7,047,734 B2
(45) Date of Patent: May 23, 2006

(54) HYDRAULIC CIRCUIT FOR HYDRAULIC CYLINDER

(75) Inventors: Masahiro Tosen, Fukushima (JP);
Tatsuya Futami, Fukushima (JP);
Kenji Kanemaru, Kanagawa (JP);
Yoshiaki Yamamoto, Kanagawa (JP)

(73) Assignees: Komatsu Ltd., Tokyo (JP); Komatsu Zenoah Co., Saitama (JP)

( * ) Notice: Subject to any disclaimer, the term of this patent is extended or adjusted under 35 U.S.C. 154(b) by 28 days.

(21) Appl. No.: 10/972,413

(22) Filed: Oct. 26, 2004

(65) Prior Publication Data

US 2005/0098326 A1    May 12, 2005

(30) Foreign Application Priority Data

Oct. 28, 2003    (JP) .............................. 2003-367611

(51) Int. Cl.
*F16D 31/02*    (2006.01)
(52) U.S. Cl. .............................. 60/413; 60/469; 92/109
(58) Field of Classification Search .................. 60/413, 60/417, 469; 92/109, 110
See application file for complete search history.

(56) References Cited

U.S. PATENT DOCUMENTS

| | | | |
|---|---|---|---|
| 3,563,136 A | * | 2/1971 | Valente ........................ 92/110 |
| 3,779,135 A | * | 12/1973 | Sugimura ..................... 60/413 |
| 3,869,861 A | * | 3/1975 | Case ............................ 60/413 |
| 4,341,149 A | | 7/1982 | Dezelan |

FOREIGN PATENT DOCUMENTS

| | | |
|---|---|---|
| GB | 1 236 384 | 6/1971 |
| GB | 1 306 609 | 2/1973 |
| GB | 2 000 227 | 1/1979 |
| GB | 2 016 980 | 10/1979 |
| JP | 49-104075 | 10/1974 |
| SU | 804792 | 2/1981 |
| SU | 876890 | 10/1981 |

* cited by examiner

*Primary Examiner*—Thomas E. Lazo
(74) *Attorney, Agent, or Firm*—Wenderoth, Lind & Ponack, L.L.P.

(57) ABSTRACT

A hydraulic circuit for a hydraulic cylinder capable of executing and adjusting a shock absorbing function at the time of stopping the operation of a cylinder piston rod and releasing the function, comprises a damping control valve (v1) having a first switching position (v11) which blocks the connection of the accumulation port (22) with outside and performs supply and discharge or discharge and supply of the operating oil with respect to the first cylinder chamber (3) and the second cylinder chamber (4), a second switching position (v12) connecting at least the accumulation port (22) and the second cylinder chamber (4), and a third switching position (v13) connecting at least the accumulation port (22) and the first cylinder chamber (3).

9 Claims, 16 Drawing Sheets

HYDRAULIC CIRCUIT FOR HYDRAULIC CYLINDER

BACKGROUND OF THE INVENTION

1. Field of the Invention

The present invention relates to a hydraulic circuit for a hydraulic cylinder to be used for a civil engineering machine such as a power shovel or equipment driven by a hydraulic pressure, and more particularly to improvements of a hydraulic circuit for a hydraulic cylinder having a shock absorbing function at the time of stopping the operation of a cylinder piston rod.

2. Description of the Related Art

Conventionally, a hydraulic cylinder is used for various types of civil engineering machines such as a power shovel to drive a working machine such as a bucket.

The hydraulic cylinder is provided with a cylinder rod that performs a linear reciprocating motion within a cylinder by a hydraulic pressure of an operating oil.

The cylinder rod is provided at its one end with a cylinder piston inserted into the cylinder, and the interior of the cylinder is divided into two cylinder chambers by the cylinder piston.

The operating oil is supplied under pressure into one of the two cylinder chambers to linearly move the cylinder rod in an extending direction, and into the other cylinder chamber to linearly move the cylinder rod in a retracting direction, whereby a working machine such as a bucket connected to the end of the cylinder rod is driven to operate.

In order to control the movement of the working machine, there is an occasion in which the hydraulic cylinder stops feeding of the operating oil under pressure to the cylinder chamber by the control valve, whereby the linear movement of the cylinder rod is stopped temporarily.

In such an occasion, if the feeding of the operating oil under pressure to the cylinder chamber is stopped suddenly, the operating oil accumulated in the cylinder chamber is compressed by an inertial force of the cylinder piston. Due to the incompressibility of the operating oil, the operating oil accumulated in the cylinder chamber becomes high resistance so that the cylinder rod stops suddenly. As a result, the cylinder itself receives a large shock, resulting in the generation of large vibration and noise in the equipment using the hydraulic cylinder.

Japanese patent application publication no. 49-104075 discloses the configuration in which an accumulator, which has a shock absorbing function comprising an accumulator piston and a coil spring supporting the accumulator piston, is disposed in a cylinder rod, and both sides of the accumulator piston are constantly communicated with respective corresponding cylinder chambers.

According to the hydraulic cylinder disclosed in Japanese patent application publication no. 49-104075, when the operating oil being fed under pressure to the cylinder chamber is stopped suddenly in order to stop the action of the cylinder rod, the operating oil accumulated in the cylinder chamber is compressed by an inertial force of the cylinder piston connected to the cylinder rod. The operating oil compressed in the cylinder chamber frees in part to the accumulator piston side, and the coil spring is pushed to be extended/retracted by the pressure of the freed portion of the operating oil via the accumulator piston.

Then, the pressure of the operating oil in the cylinder chamber is gradually absorbed by the damper function of the coil spring, which is extended/retracted by the hydraulic pressure of the freed operating oil, until it balances with the pressure due to the coil spring. Thus, the shock generated in the cylinder is reduced.

Incidentally, in the conventional hydraulic cylinder that has the accumulator having the shock absorbing function disposed in the cylinder rod as described in Japanese patent application publication no. 49-104075, the accumulator is constituted by an accumulator piston and a coil spring that supports the accumulator piston, and the both sides of the accumulator piston are kept communicated with their corresponding cylinder chambers through oil passages, so that the shock absorbing function is constantly acting on the hydraulic cylinder.

Therefore, with the conventional hydraulic cylinder, when the cylinder rod is stopped suddenly to quickly stop the working machine at a prescribed position, the cylinder rod is kept vibrating until the hydraulic pressure in the cylinder chamber and the pressure of the spring of the accumulator are balanced with each other by the shock absorbing function of the accumulator that keeps acting. Thus, the conventional hydraulic cylinder has a disadvantage that the working machine such as a bucket cannot be stopped and positioned quickly at a prescribed position by suddenly stopping the cylinder rod.

SUMMARY OF THE INVENTION

The present invention has been made in view of the above circumstances and provides a hydraulic circuit for a hydraulic cylinder capable of freely executing and adjusting the shock absorbing function when the operation of the cylinder piston rod is stopped, and releasing the function.

A first aspect of the present invention provides a hydraulic circuit for a hydraulic cylinder, wherein the hydraulic cylinder comprises a first cylinder chamber to which an operating oil is supplied during a retracting operation; a second cylinder chamber to which an operating oil is supplied during an extending operation; an accumulator comprising an accumulator piston which is inserted into a cylinder rod and divides an interior of the cylinder rod into first and second cylinder rod chambers, and a gas which is hermetically charged into the second cylinder rod chamber; and an accumulation port which supplies and discharges an operating oil to and from the first cylinder rod chamber of the accumulator, the hydraulic circuit comprising a damping control valve having a first switching position in which connection of the accumulation port with outside is blocked, and supply and discharge or discharge and supply of the operating oil are performed for the first cylinder chamber and the second cylinder chamber, a second switching position in which at least the accumulation port and the second cylinder chamber are connected, and a third switching position in which at least the accumulation port and the first cylinder chamber are connected.

A second aspect of the present invention provides the hydraulic circuit for a hydraulic cylinder according to the first aspect, wherein the damping control valve is disposed integral with or close to the hydraulic cylinder.

A third aspect of the present invention provides the hydraulic circuit for a hydraulic cylinder according to the first and second aspects, further comprising a direction switching valve having a first switching position in which the operating oil is supplied to the first cylinder chamber and the operating oil is discharged from the second cylinder chamber, a second switching position in which supply/discharge of the operating oil for the first cylinder chamber and the second cylinder chamber is stopped, and a third switching position in which the operating oil is supplied to the second cylinder chamber and the operating oil is discharged from the first cylinder chamber, the direction switching valve being disposed integral with or close to the damping control valve.

A fourth aspect of the present invention provides the hydraulic circuit for a hydraulic cylinder according to any of claims 1 to 3, wherein the damping control valve is connected to the direction switching valve via a first supply/discharge pipe and a second supply/discharge pipe for supplying and discharging the operating oil; the accumulation port and the second cylinder chamber are connected to the first supply/discharge pipe at the second switching position of the damping control valve via a first throttle means; and the accumulation port and the first cylinder chamber are connected to the second supply/discharge pipe at the third switching position of the damping control valve via a second throttle means.

A fifth aspect of the present invention provides a damping control valve for driving and controlling a hydraulic cylinder, wherein the hydraulic cylinder comprises a first cylinder chamber to which an operating oil is supplied during a retracting operation; a second cylinder chamber to which an operating oil is supplied during an extending operation; an accumulator comprising an accumulator piston which is inserted into a cylinder rod and divides an interior of the cylinder rod into first and second cylinder rod chambers, and a gas which is hermetically charged into the second cylinder rod chamber; and an accumulation port which supplies and discharges an operating oil to and from the first cylinder rod chamber of the accumulator, the damping control valve having a first switching position in which connection of the accumulation port with outside is blocked, and supply and discharge or discharge and supply of the operating oil are performed for the first cylinder chamber and the second cylinder chamber, a second switching position in which at least the accumulation port and the second cylinder chamber are connected, and a third switching position in which at least the accumulation port and the first cylinder chamber are connected.

A sixth aspect of the present invention provides a damping control valve according to the fifth aspect, further comprising a first supply/discharge pipe and a second supply/discharge pipe for supplying and discharging the operating oil that are connected to the damping control valve, wherein the accumulation port and the second cylinder chamber are connected to the first supply/discharge pipe at the second switching position of the damping control valve via a first throttle means; and the accumulation port and the first cylinder chamber are connected to the second supply/discharge pipe at the third switching position of the damping control valve via a second throttle means.

According to the first aspect of the present invention, the hydraulic circuit for the hydraulic cylinder is provided with a damping control valve which has a first switching position where connection of the accumulation port with outside is blocked and supply and discharge or discharge and supply of the operating oil are performed with respect to the first cylinder chamber and the second cylinder chamber, a second switching position where at least the accumulation port and the second cylinder chamber are connected, and a third switching position where at least the accumulation port and the first cylinder chamber are connected. Therefore, the retraction and extension of the hydraulic cylinder can be performed by switching the damping control valve to the first switching position.

When the retracting operation of the hydraulic cylinder is stopped, a damping effect can be obtained and a shock at the time when stopped can be prevented by switching the damping control valve to the second switching position. Similarly, when the extending operation of the hydraulic cylinder is stopped, a damping effect can be obtained and a shock at the time when stopped can be prevented by switching the damping control valve to the third switching position.

At the same time, at the time when the operation is stopped, the gas in the second cylinder rod chamber of the accumulator is compressed to provide an accumulation effect of potential energy, and an auxiliary force can be exerted when the hydraulic cylinder is started next time.

Thus, the recovery and reuse of energy can be made by a process of accumulation and release of its energy by the accumulator, and energy saving can be made.

According to the second aspect of the present invention, no pipe is required between the hydraulic cylinder and the damping control valve, and a drive control response of the hydraulic cylinder by the damping control valve is good.

According to the third aspect of the present invention, because the direction switching valve according to the present invention is disposed integral with or close to the damping control valve, the piping for the supply/discharge of the operating oil connected to the direction switching valve can be divided into a high-pressure pipe and a low-pressure pipe, and the direction of flowing the operating oil though the pipe can be fixed, and the pipe design can be optimized.

The operating oil remaining in the pipe is little, and the switching control response of the hydraulic cylinder by the direction switching valve is improved because the pipe between the direction switching valve and the damping control valve can be made short.

According to the fourth aspect of the present invention, the accumulation port and the second cylinder chamber are connected to the first supply/discharge pipe via the first throttle means at the second switching position of the damping control valve, so that adjustment of damping and adjustment of accumulation can be made by adjusting the first throttle means at the time of stopping the retracting operation. And, the accumulation port and the first cylinder chamber are connected to the second supply/discharge pipe via a second throttle means at the third switching position of the damping control valve, so that adjustment of damping and adjustment of accumulation can be made by adjusting the second throttle means at the time of stopping the extending operation.

According to the fifth aspect of the present invention, the hydraulic cylinder can be retracted or extended by switching the damping control valve to the first switching position.

When the retracting operation of the hydraulic cylinder is stopped by switching to the second switching position, the damping effect can be obtained and a shock at the time of stopping can be prevented from occurring. And, when the extending operation of the hydraulic cylinder is stopped by switching to the third switching position in the same way, the damping effect can be obtained, and a shock at the time of stopping can be prevented from occurring.

At the same time, the gas in the second cylinder rod chamber of the accumulator is compressed and a potential energy accumulation effect is obtained at the time of stopping the operation, and an auxiliary force can be exerted at the next start of the hydraulic cylinder.

Thus, the recovery and reuse of the energy can be performed by the process in that the accumulation in the accumulator and the release of its energy are conducted, and the energy saving can be achieved.

According to the sixth aspect of the present invention, the adjustment of damping and the adjustment of accumulation at the time of stopping the retracting operation can be made by adjusting the first throttle means at the second switching position of the damping control valve, and the adjustment of damping and the adjustment of accumulation at the time of stopping the extending operation can be made by adjusting the second throttle means at the third switching position.

BRIEF DESCRIPTION OF THE DRAWINGS

Embodiments of the present invention will be described in detail based on the following figures, wherein.

DESCRIPTION OF THE PREFERRED EMBODIMENTS

Embodiments of the hydraulic cylinder according to the present invention will be described in detail with reference to the accompanying drawings.

Figure 1:
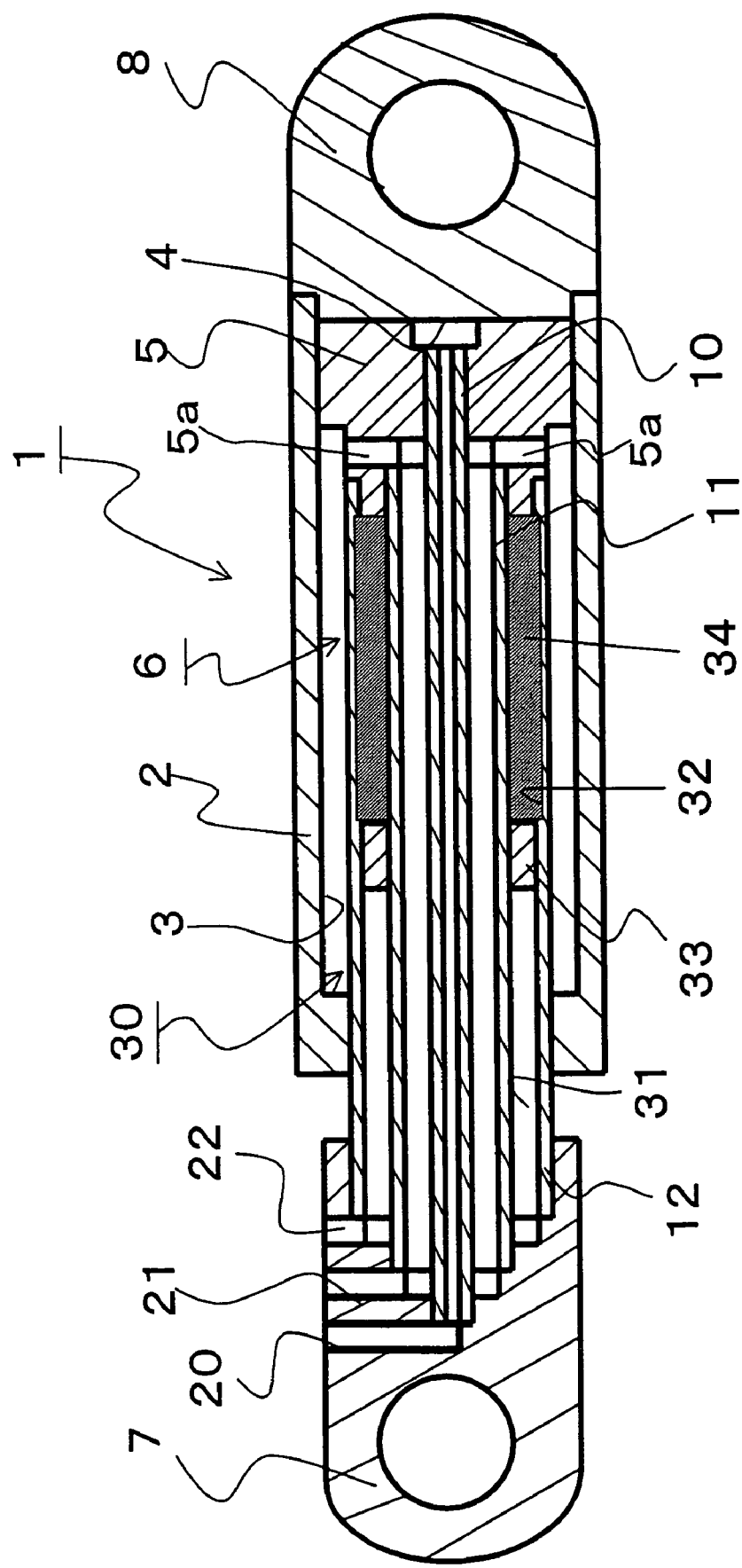
FIG. 1 is a schematic sectional view of the hydraulic cylinder according to an embodiment of the present invention.

FIG. 1 is a schematic sectional view showing a hydraulic cylinder 1, by way of example, to be used in embodiments of a hydraulic circuit for a hydraulic cylinder according to the present invention.

The hydraulic cylinder 1 comprises a cylinder 2, a cylinder piston 5, which is inserted into the cylinder 2 and divides the cylinder 2 into a first cylinder chamber 3 and a second cylinder chamber 4, and a cylinder rod 6 with the cylinder piston 5 fixed to its one end. To the right end of the cylinder 2 and the left end of the cylinder rod 6A, a rod head 7 and a cylinder head 8 each having a hole for connection of equipment such as a working machine are fixed.

The cylinder rod 6 has a concentric triple tubular structure comprising a first guide tube 10 having a small diameter, a second guide tube 11 having an intermediate diameter for surrounding the first guide tube 10 and a third guide tube 12 having a large diameter for surrounding the second guide tube 11.

Among the first to third guide tubes 10, 11, 12, the right end of the first guide tube 10 is communicated with the second cylinder chamber 4, and its left end is communicated with a head side port 20 formed in the rod head 7.

The second guide tube 11 has its right end communicated with the first cylinder chamber 3 through a hole 5a formed in the cylinder piston 5, and its left end communicated with a bottom side port 21 formed in the rod head 7.

An accumulator 30 having a shock absorbing function, which is a major component of the present invention, is disposed in the third guide tube 12 having the largest diameter.

The accumulator 30 comprises an accumulator piston 33 that is inserted into the third guide tube 12 and divides the third guide tube 12 into a first cylinder rod chamber 31 and a second cylinder rod chamber 32, a compressive gas 34 that is filled into the second cylinder rod chamber 32 and an accumulation port 22 that is formed in the rod head 7 and communicated with the first cylinder rod chamber 31.

The head side port 20, the bottom side port 21 and the accumulation port 22 are formed at positions adjacent to one another in the rod head 7.

The action of the hydraulic cylinder 1 will be described, and its structure will also be described in further detail.

Figure 2:
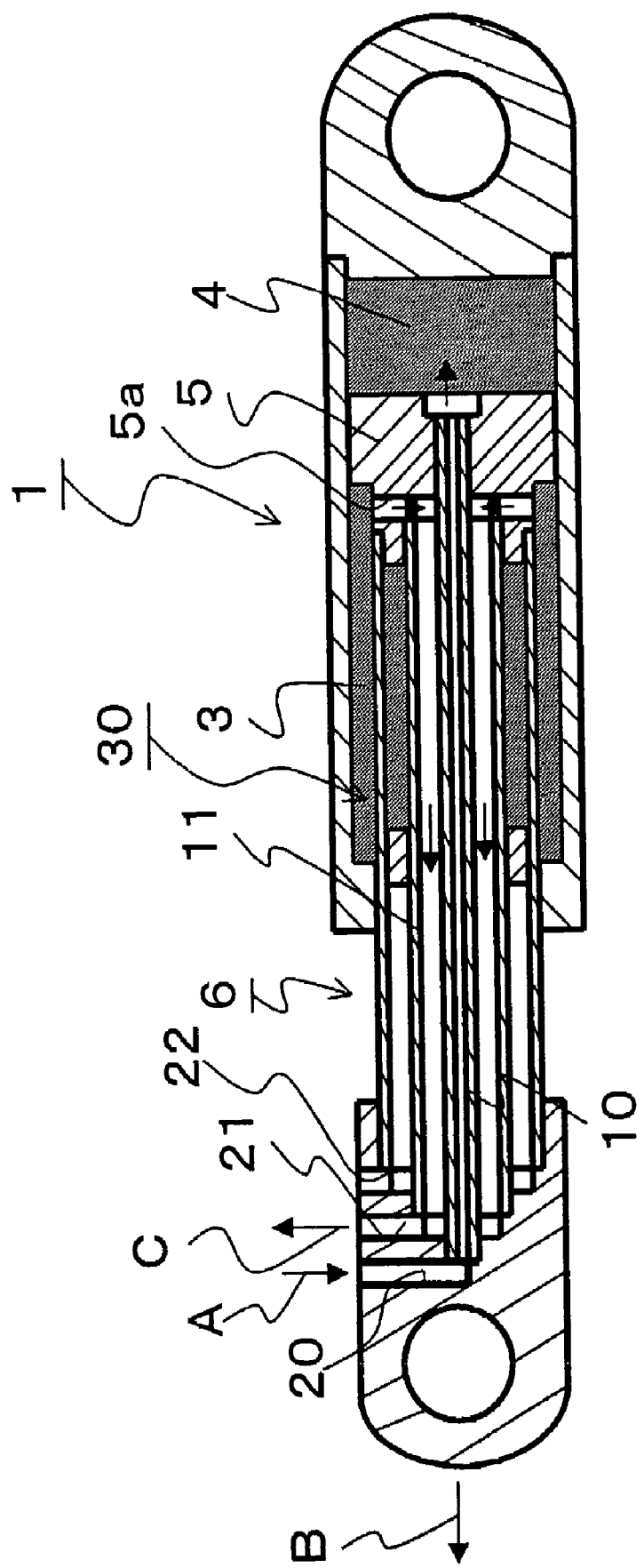
FIG. 2 is a schematic sectional view showing a normal operational state of the hydraulic cylinder according to the embodiment of the present invention.

Referring to FIG. 2, when the cylinder rod 6 is extended in a normal operation, an operating oil A is fed under pressure from the head side port 20 into the first guide tube 10 by using an operating oil supply means (not shown) comprising a hydraulic motor, control valve, etc., thereby filling the second cylinder chamber 4 with the operating oil. Thus, the cylinder rod 6 is extended via the cylinder piston 5 as indicated by an arrow B. To extend the cylinder rod 6, the operating oil filled in the first cylinder chamber 3 flows into the second guide tube 11 through the hole 5*a*, and the operating oil flown into the second guide tube 11 is discharged as indicated by an arrow C through the bottom side port 21.

Figure 3:
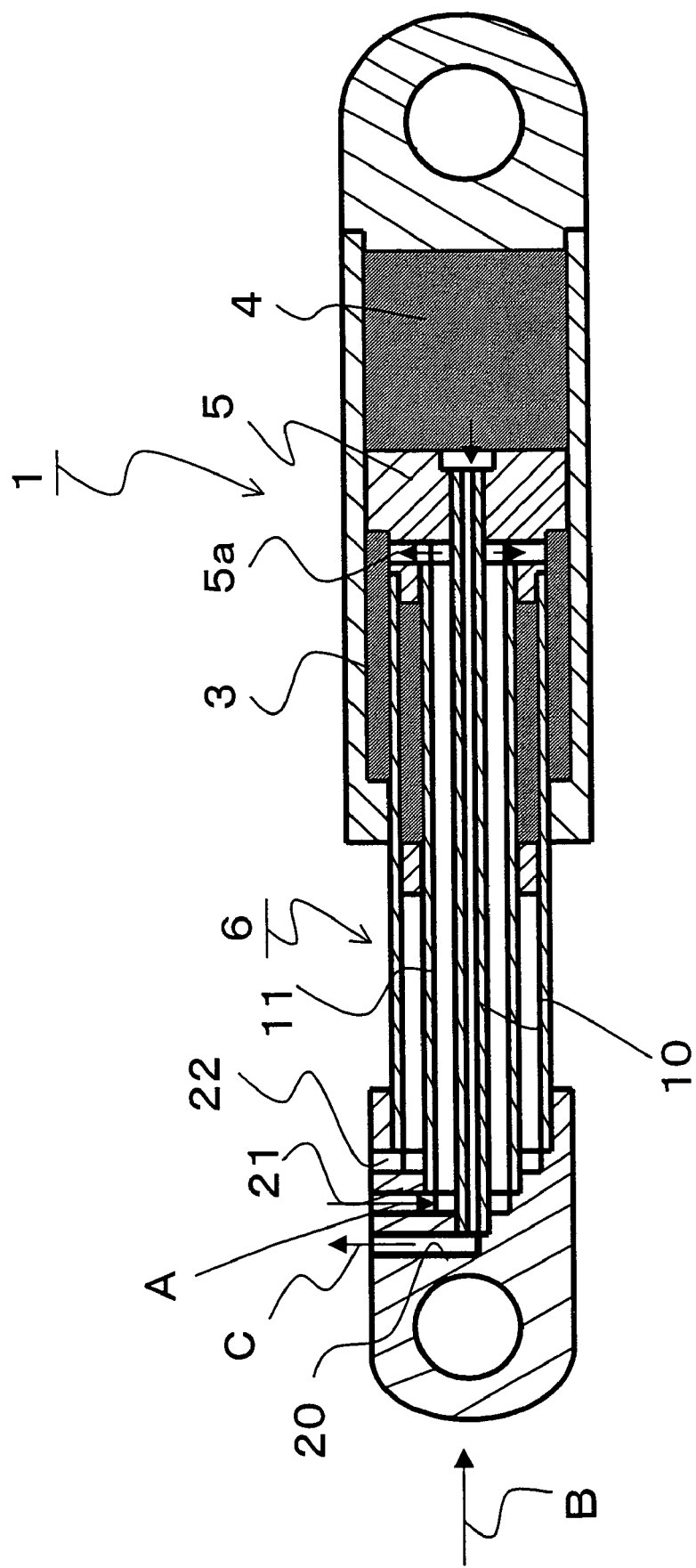
FIG. 3 is a schematic sectional view showing a normal operational state of the hydraulic cylinder according to the embodiment of the present invention.

On the other hand, referring to FIG. 3, when the cylinder rod 6 is retracted in a normal operation, the operating oil A is fed under pressure from the bottom side port 21 into the second guide tube 11, thereby filling the operating oil into the first cylinder chamber 3 through the hole 5*a*. Thus, the cylinder rod 6 is retracted via the cylinder piston 5 as indicated by the arrow B. To retract the cylinder rod 6, the operating oil filled in the second cylinder chamber 4 flows into the first guide chamber 10, and the operating oil flown into the first guide tube 10 is discharged through the head side port 20 as indicated by the arrow C.

Now, an operation to stop the cylinder rod 6 at a desired position where the cylinder rod 6 moves in a normal operation will be described in case of extending the cylinder rod 6 as an example.

In this case, an inflow of the operating oil A and an outflow of the operating oil C shown in FIG. 2 are stopped by, for example, a control valve.

Then, the operating oil accumulated in the first cylinder chamber 3 is compressed by the inertial force of the cylinder piston 5. At that time, the operating oil accumulated in the first cylinder chamber 3 operates as a large resistance because of the incompressibility of the operating oil accumulated in the first cylinder chamber 3. Then, the cylinder rod 6 is stopped suddenly so as to stop at a desired position accurately. In this case, there is naturally a possibility that the cylinder itself may produce a large shock because the hydraulic cylinder has the same function as before.

For example, when the cylinder rod 6 is desired to stop suddenly at a prescribed position while it is retracting in a normal operation, the inflow of the operating oil A and the outflow of the operating oil C shown in FIG. 3 are stopped by the control valve for example.

Then, the operating oil accumulated in the second cylinder chamber 4 is compressed by the inertial force of the cylinder piston 5, the operating oil accumulated in the second cylinder chamber 4 operates as a large resistance because of the incompressibility of the operating oil accumulated in the second cylinder chamber 4, and the cylinder rod 6 is stopped suddenly to stop accurately at a desired position. There is naturally a possibility that the cylinder itself may produce a large shock because the hydraulic cylinder comes to have the same function as in the conventional hydraulic cylinder.

As an example of the above-described case in which it is necessary to stop quickly the cylinder rod 6 at a desired position, there is a case in which a working machine such as a blade or a bucket connected to the cylinder rod is desired to be positioned quickly and accurately on the ground surface in order to perform a ground-leveling leveling work by a civil engineering machine.

Then, the above-described shock absorbing function using the accumulator 30 of the hydraulic cylinder 1 will be described.

Figure 4:
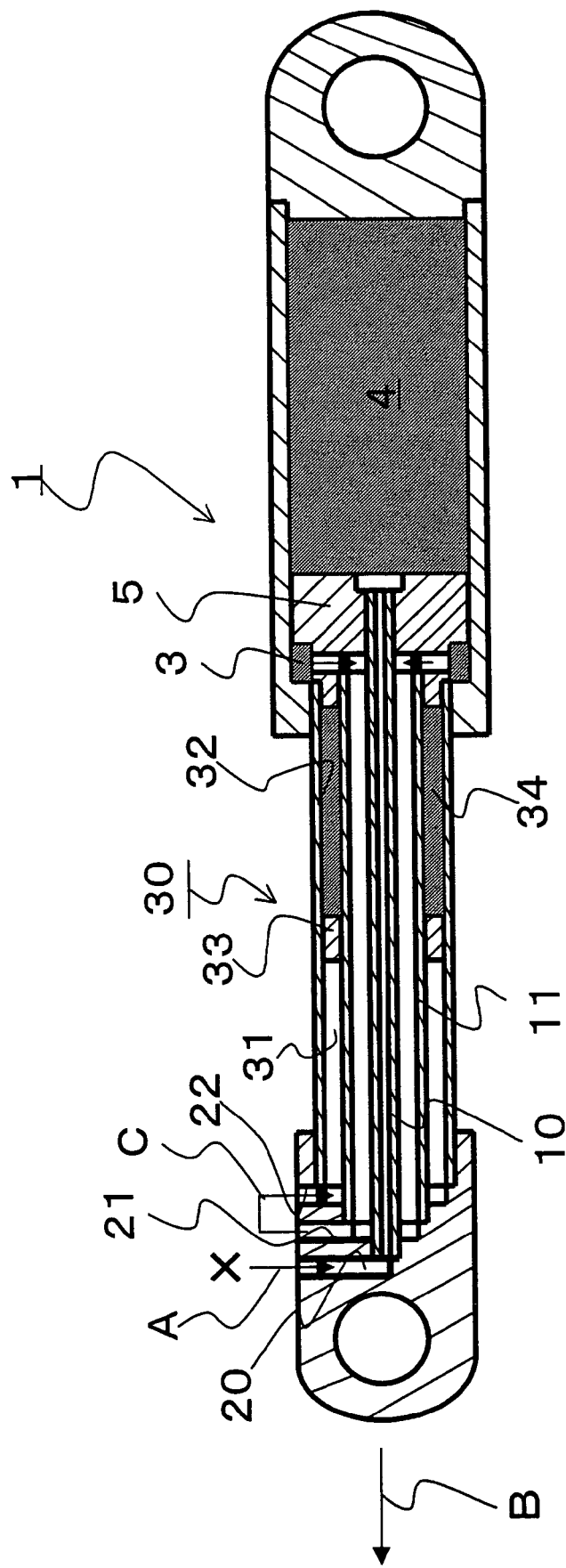
FIG. 4 is a schematic sectional view showing a state that a shock absorbing function of the hydraulic cylinder according to the embodiment of the present invention is activated.

As shown in FIG. 2, when the cylinder rod 6 that is extended is stopped from moving on the bottom side of the cylinder 2 by the shock absorbing function of the accumulator 30, a control valve or the like (not shown) is used to stop the supply of the operating oil A that is fed under pressure from the head side port 20 into the first guide tube 10 as shown in FIG. 4. At the same time, the bottom side port 21 and the accumulation port 22 are communicated with each other to guide the operating oil C of the first cylinder chamber 3 flowing out of the bottom side port 21 into the first cylinder rod chamber 31 of the accumulator 30.

Figure 5:
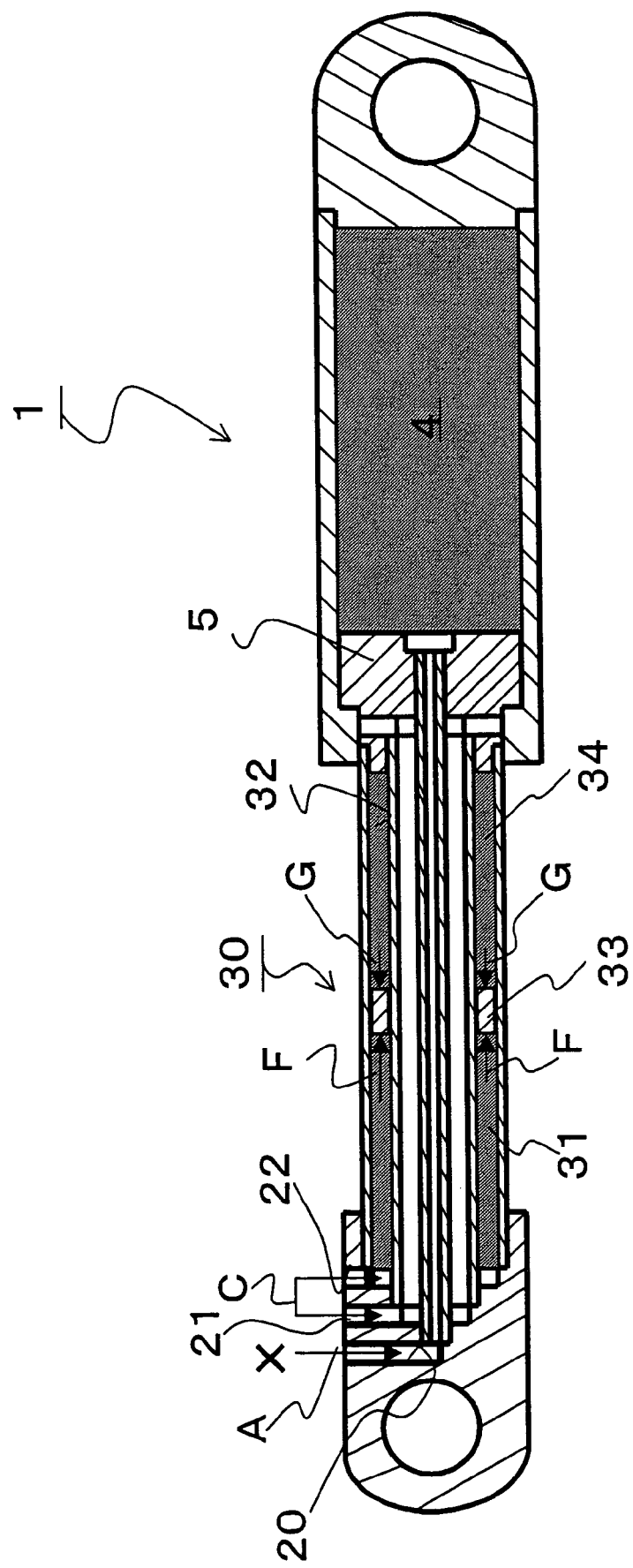
FIG. 5 is a schematic sectional view showing a state that the shock absorbing function of the hydraulic cylinder according to the embodiment of the present invention is activated.

Thus, when the operating oil C of the first cylinder chamber 3 flowing out of the bottom side port 21 is guided into the first cylinder rod chamber 31 of the accumulator 30, the accumulator piston 33 is pushed by the pressure of the operating oil C compressed by the cylinder piston 5 as shown in FIG. 5, and its pressure F reduces gradually until the pressure F is balanced with a pressure G by the compressive gas 34 that is hermetically charged into the second cylinder rod chamber 32 with the accumulator piston 33 therebetween.

Thus, with the use of the accumulator 30, the damper function of the accumulator 30 utilizing the compressibility of the gas 34 enables to absorb a shock produced when the cylinder rod 6 is stopped suddenly while it is extended.

Figure 6:
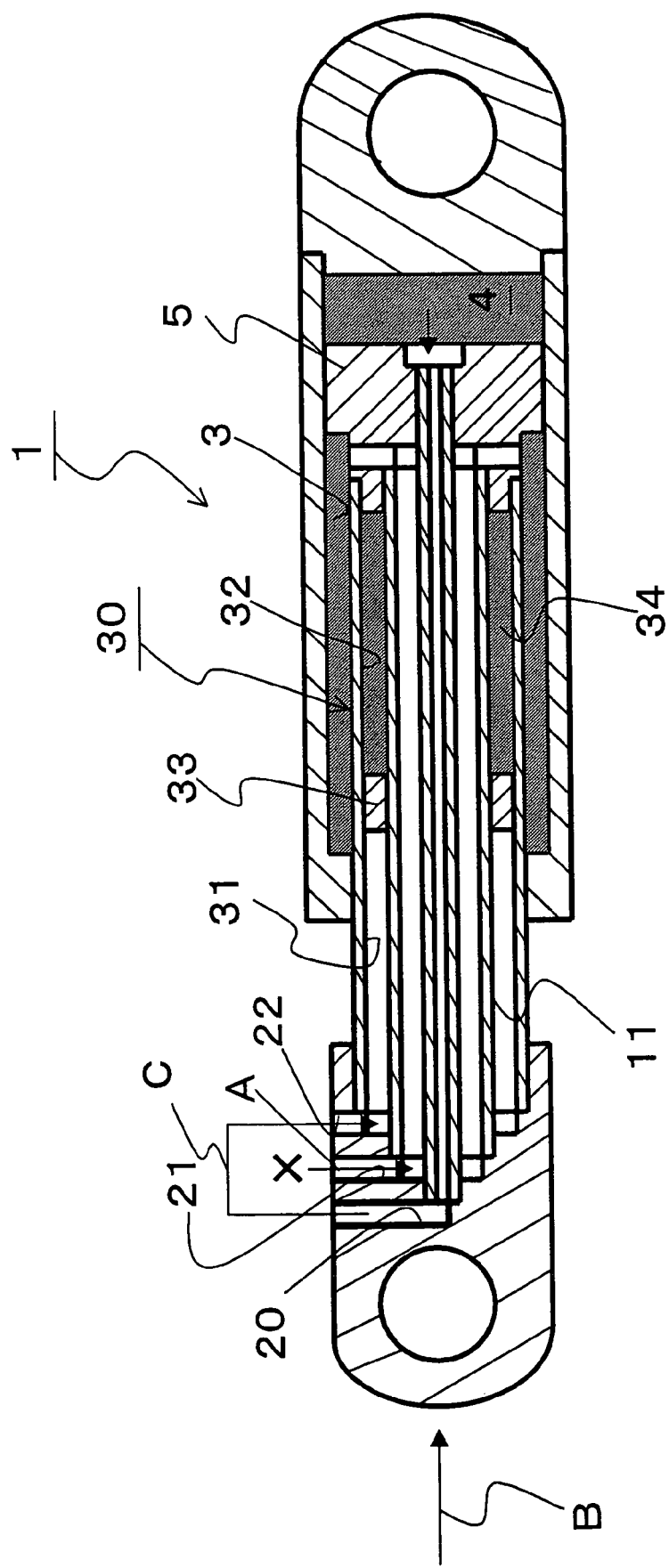
FIG. 6 is a schematic sectional view showing a state that the shock absorbing function of the hydraulic cylinder according to the embodiment of the present invention is activated.

Similarly, where the movement of the cylinder rod 6 is to be stopped on the head side of the cylinder 2 by using the shock absorbing function by the accumulator 30 when the cylinder rod 6 is retracted, a control valve or the like (not shown) is used to stop the supply of the operating oil A that is fed under pressure from the bottom side port 21 into the second guide tube 11 as shown in FIG. 6. At the same time, the head side port 20 and the accumulation port 22 are communicated with each other to guide the operating oil C of the second cylinder chamber 4 flowing out of the head side port 20 into the first cylinder rod chamber 31 of the accumulator 30.

Figure 7:
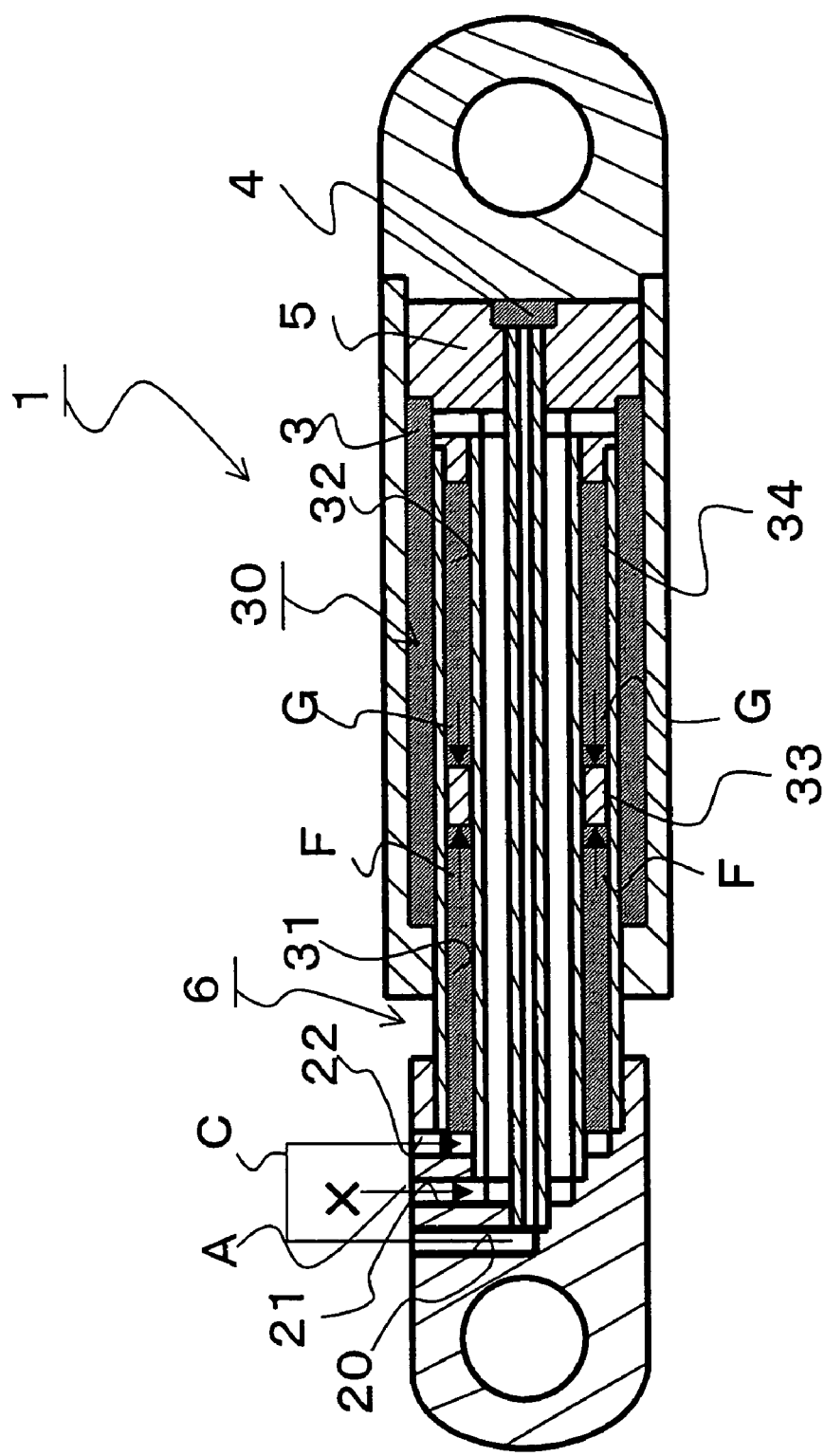
FIG. 7 is a schematic sectional view showing a state that the shock absorbing function of the hydraulic cylinder according to the embodiment of the present invention is activated.

Thus, when the operating oil C filled in the second cylinder chamber 4 and flown out of the head side port 20 is guided into the first cylinder rod chamber 31 of the accumulator 30, the pressure of the operating oil C reduces gradually until the pressure F of the operating oil C is compressed by the cylinder piston 5 and the pressure G of the gas 34 hermetically charged into the second cylinder rod chamber 32 are balanced with the accumulator piston 33 between them as shown in FIG. 7. A shock produced when the cylinder rod 6 is suddenly stopped at the time of retraction by the damper function utilizing the compressibility of the gas 34 can also be absorbed.

In the above description, the shock absorbing function of the acting accumulator 30 when the cylinder piston 5 is stopped on the head side or the bottom side of the cylinder piston 5 in the cylinder 2 was explained in detail. In the hydraulic cylinder 1, however, the shock absorbing function of the accumulator 30 can also be activated even when the cylinder piston 5 in the cylinder 2 is stopped at a desired position between the head side and the bottom side of the cylinder piston 5.

Figure 8:
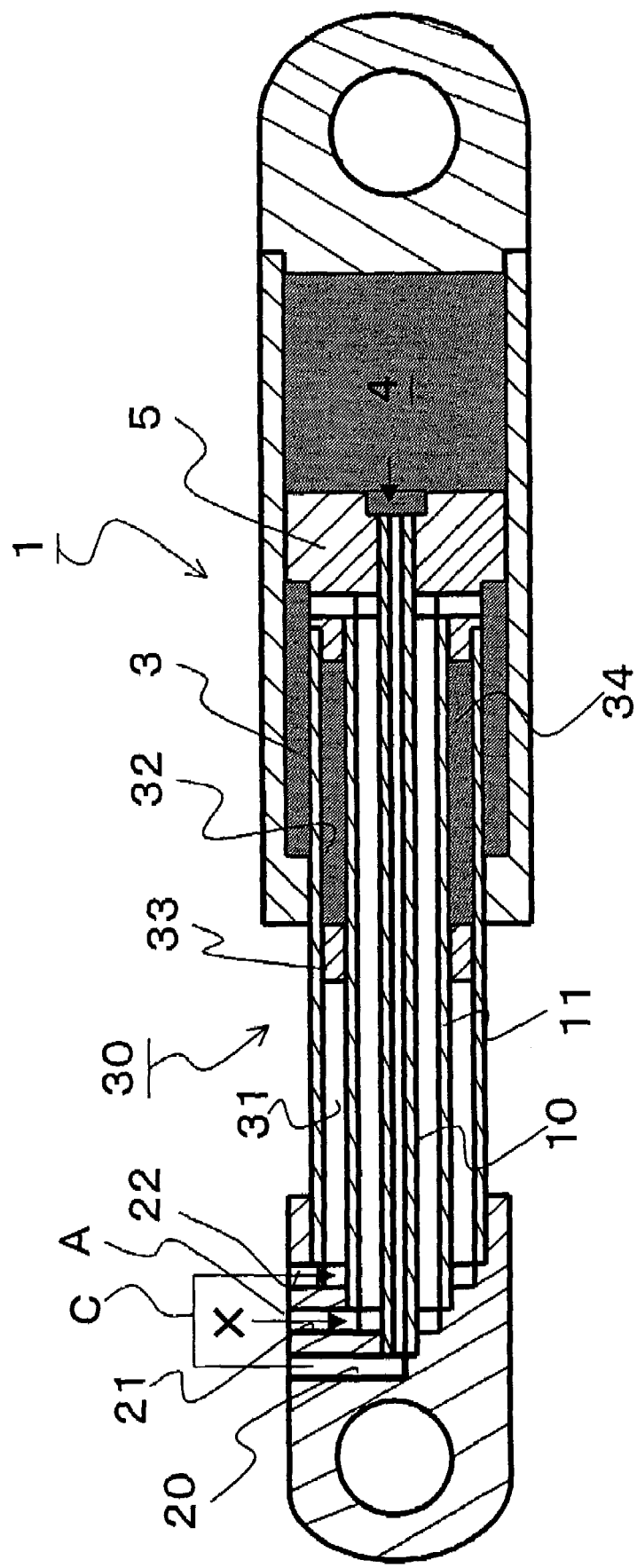
FIG. 8 is a schematic sectional view showing a state that the shock absorbing function of the hydraulic cylinder according to the embodiment of the present invention is activated.

Specifically, when, for example, the cylinder rod 6 is retracted and stopped at a desired position as shown in FIG. 3, and when the shock absorbing function of the accumulator 30 is activated at that time, a control valve or the like (not shown) is used to stop the supply of the operating oil A, which is fed under pressure from the bottom side port 21 into the second guide tube 11 as shown in FIG. 8 and, at the same time, the head side port 20 and the accumulation port 22 are mutually communicated with each other to guide the operating oil C flowing out of the head side port 20 into the first cylinder rod chamber 31 of the accumulator 30.

Figure 9:
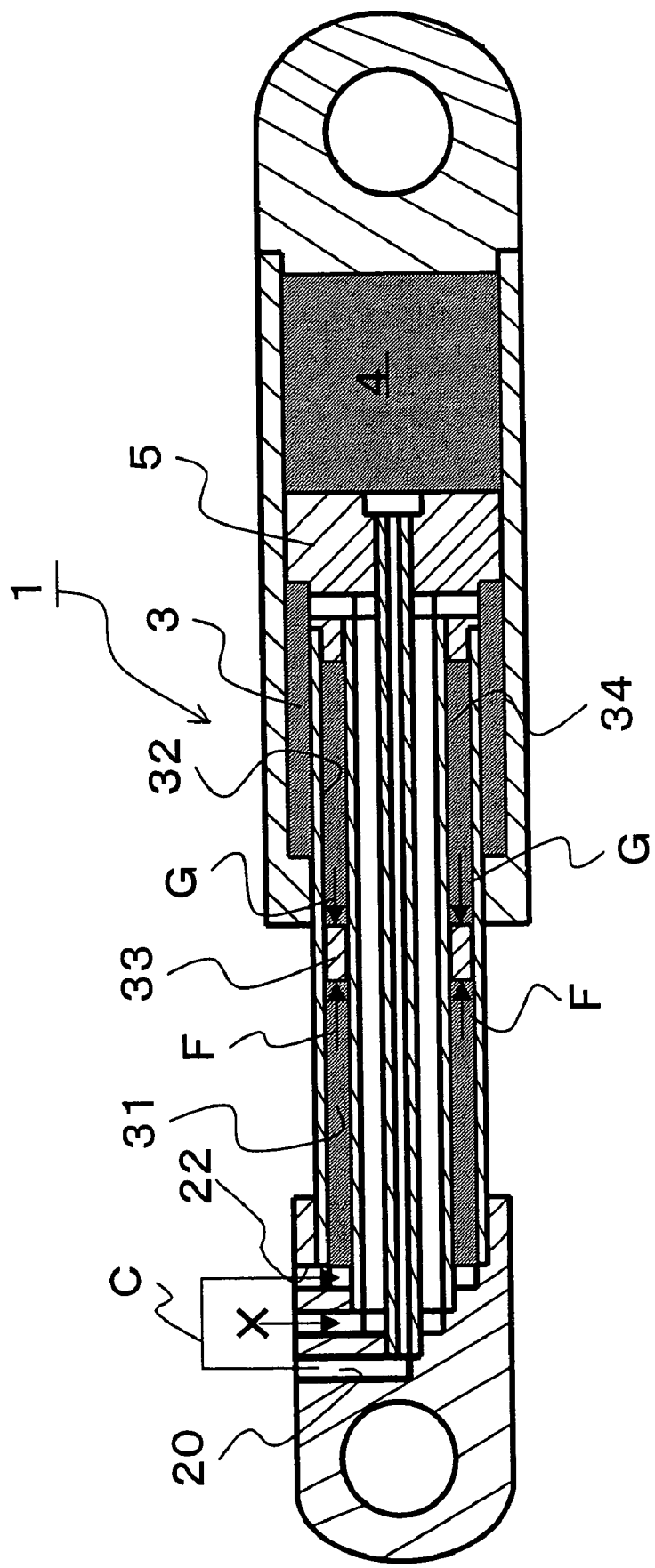
FIG. 9 is a schematic sectional view showing a state that the shock absorbing function of the hydraulic cylinder according to the embodiment of the present invention is activated.

Thus, when the operating oil C of the second cylinder chamber 4 flowing out of the head side port 20 is guided into the first cylinder rod chamber 31 of the accumulator 30, the accumulator piston 33 is pushed by the pressure of the operating oil C compressed by the cylinder piston 5 as shown in FIG. 9. The pressure F reduces gradually before the pressure F and the pressure G because of the compressive gas 34 hermetically charged into the second cylinder rod chamber 32 are mutually balanced with the accumulator piston 33 between them.

Therefore, when the accumulator 30 is used, a shock produced when the cylinder piston 5 is stopped at a desired position between the head side and the bottom side of the cylinder piston 5 in the cylinder 2 can also be absorbed in the same way by the damper function of the accumulator 30 utilizing the compressibility of the gas 34.

In the above-described example, the accumulator 30 is used for only the shock absorbing function of the hydraulic cylinder 1. The accumulator 30 may be used as a single accumulator in the hydraulic circuit serving as a single accumulator for preventing pulsation of the hydraulic pressure in the hydraulic circuit as its inherent function, thereby to make the hydraulic circuit small and compact.

In the above-described example, the hydraulic cylinders 1, 40 were described mainly concerning the shock absorbing function of the accumulator 30. The accumulator 30 of the hydraulic cylinders 1, 40 according to the present invention can execute not only the shock absorbing function but also the damper function when the hydraulic cylinders 1, 40 are stopped.

Specifically, in a construction machine such as a wheel loader, the bucket is driven by the hydraulic cylinder to load earth and sand in the bucket, the hydraulic cylinder is stopped from operating so as to put the hydraulic cylinder in a hold state. Thereafter, when the construction machine moves with the earth and sand loaded in the bucket, it receives shocks and vibrates because of bumps or the like on a road surface. As a result, the earth and sand loaded in the bucket may fall down from the bucket.

To prevent this, in a conventional hydraulic cylinder, the accumulator is connected to the hydraulic cylinder independent form the bucket cylinder hydraulic circuit that supplies the hydraulic cylinder with the operating oil so as to absorb or reduce a shock applied to the vehicle by means of the compressibility of the gas filled in the accumulator. The accumulator 30 for the hydraulic cylinders 1, 40 according to the present invention can naturally activate the damper function at the above-described time of holding the cylinder.

As shown in FIG. 9, if a shock is applied to the hydraulic cylinder 1 when it is held with the cylinder rod stopped, a pressure is applied to the operating oil C as the cylinder piston 5 fixed to the cylinder rod moves. And, the accumulator piston 33 is pushed by the pressure. Its pressure F reduces gradually before the pressure F and the pressure G of the compressive gas 34 hermetically charged into the second cylinder rod chamber 32 are mutually balanced with the accumulator piston 33 between them.

Therefore, the accumulator 30 for the hydraulic cylinder 1 can achieve the damper function at the time of holding the cylinder as described above, and the accumulator 30 is disposed within the cylinder rod 6, so that the damper function at the time of holding the cylinder can be compact in comparison with the convention connection of the accumulator independent of the bucket cylinder hydraulic cylinder for supplying the operating oil to the hydraulic cylinder.

The hydraulic cylinder 1 is so configured that, when the cylinder rod 6 drops freely under its own weight or under load weight in a direction that the hydraulic cylinder 1 is retracted, the head side port 20 and the accumulation port 22 are communicated with each other as shown in FIG. 7 to guide the operating oil C of the second cylinder chamber 4 flowing out of the head side port 20 into the first cylinder rod chamber 31 of the accumulator 30 so that the compressive gas 34 hermetically charged into the second cylinder rod chamber 32 is compressed and accumulated in the accumulator 30. With this configuration, when the cylinder rod 6 of the hydraulic cylinder 1 is extended, the pressure accumulated in the accumulator 30 is transferred to and released from the second cylinder chamber 4 via the operating oil C. The accumulated energy is used to extend easily the cylinder rod 6 of the hydraulic cylinder 1. Thus, the energy accumulated in the accumulator 30 can be recovered and reused to provide energy savings. The recovery and reuse of the energy accumulated in the accumulator 30 are very effective when the hydraulic cylinder 1 is particularly used for a forklift or a aerial service vehicle used for working at a high location.

Now, embodiment 1 of the hydraulic circuit for driving to control the hydraulic cylinder 1 in which the accumulator 30 is built will be described.

EMBODIMENT 1

Figure 10A:
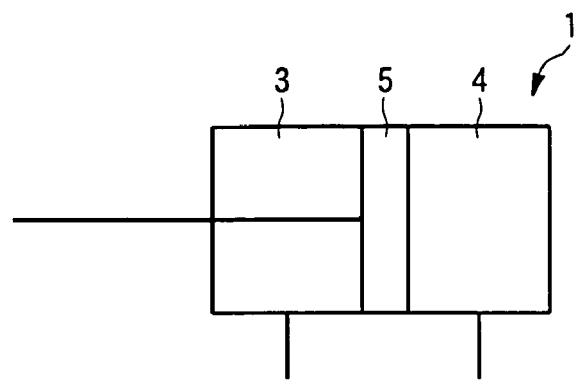
FIGS. 10A, 10B and 10C are views showing symbols of a hydraulic cylinder in a hydraulic circuit, an accumulator, and a hydraulic cylinder built in the accumulator, respectively.
Figure 10B:
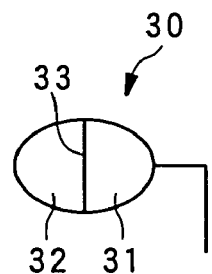

The hydraulic cylinder 1 is represented by a symbol shown in FIG. 10A, and the accumulator 30 is represented by a symbol shown in FIG. 10B.

Figure 10C:
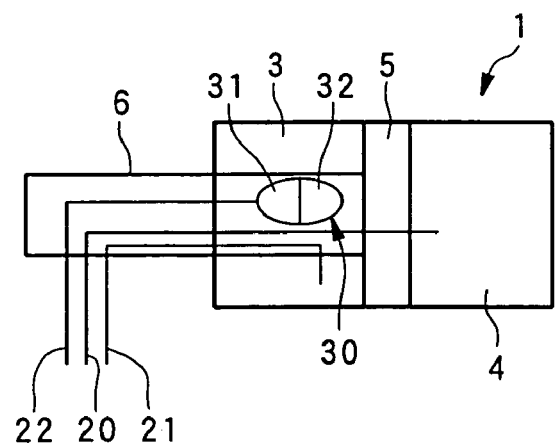

The hydraulic cylinder 1 in which the accumulator 30 is disposed is represented by a symbol shown in FIG. 10C. The head side port 20, the bottom side port 21 and the accumulation port 22 are represented as shown in FIG. 10C.

Figure 11B:
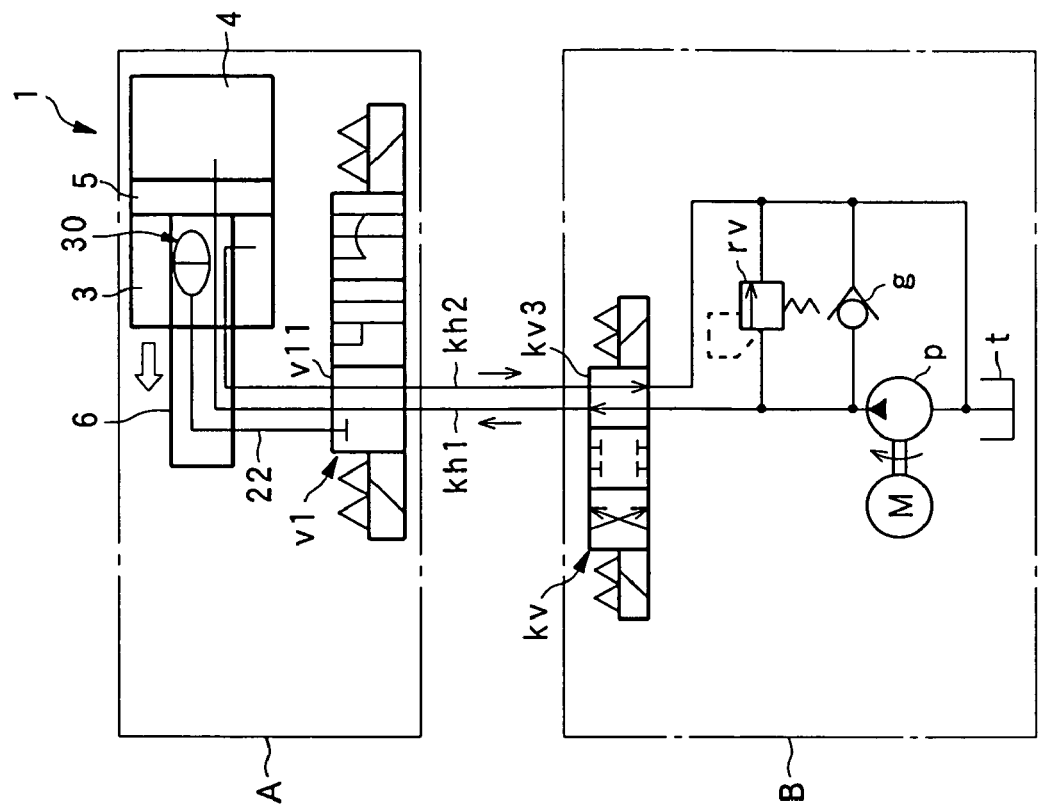
FIGS. 11A and 11B are views showing a retracted state and an extended state of a hydraulic cylinder in the hydraulic circuit for driving the hydraulic cylinder built in the accumulator, respectively, according to an embodiment of the present invention.
Figure 11A:
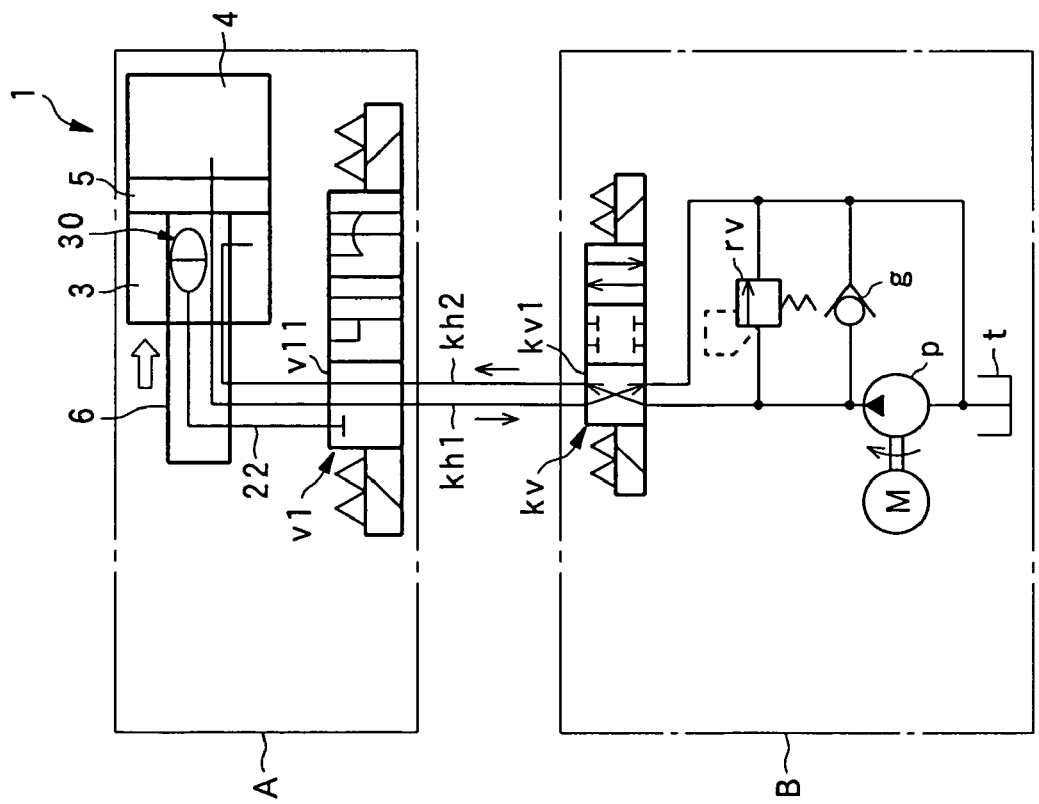

FIGS. 11A and 11B show a hydraulic circuit for driving to control the hydraulic cylinder 1 built in the accumulator 30.

The hydraulic cylinder 1 and a damping control valve v1 which is a 3-position switching valve for controlling the hydraulic cylinder 1 are disposed at the working machine A, and the damping control valve v1 is disposed integral with or near the hydraulic cylinder 1.

At a vehicle body B, there are disposed a tank t for storing the operating oil, a hydraulic-motor p for supplying the operating oil from the tank t to the working machine A, a check valve g, a relief valve rv for restricting a circuit pressure, and a direction switching valve kv for switching the hydraulic cylinder 1 among extension, retraction and holding operations.

Figure 13A:
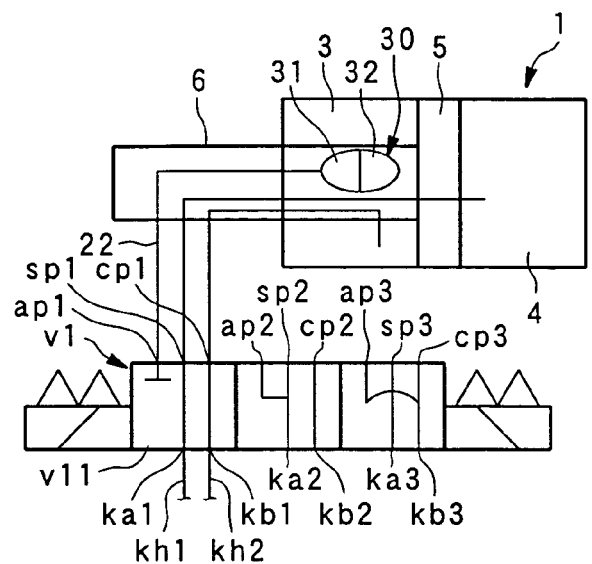
FIGS. 13A, 13B and 13C are a view showing the hydraulic cylinder in the hydraulic circuit and a connected state of the damping control valve at the time of extension/retraction of the hydraulic cylinder shown in FIGS. 11A and 11B and FIGS. 12A and 12B, a view showing a connected state at the time of stopping the retracting operation and a view showing a connected state at the time of stopping the extending operation, respectively.

The damping control valve v1 is a 5-port 3-position switching valve as shown in FIG. 13A and has accumulation ports ap1, ap2, ap3 connected to the accumulator 30, first extension/retraction ports sp1, sp2, sp3 connected to the second cylinder chamber 4 and second extension/retraction ports cp1, cp2, cp3 connected to the first cylinder chamber 3 at the hydraulic cylinder 1 and also has first supply/discharge ports ka1, ka2, ka3 and second supply/discharge ports kb1, kb2, kb3 which are used for supplying or discharging the operating oil disposed at the hydraulic motor p and the tank t.

The connection to the accumulator 30 at a first switching position v11 shown in FIG. 13A is blocked, the first extension/retraction port sp1 is connected to a first supply/discharge pipe kh1, the second extension/retraction port cp1 is connected to a second supply/discharge pipe kh2, and the operating oil is supplied or discharged with respect to the first cylinder chamber 3 and the second cylinder chamber 4. Thus, the hydraulic cylinder 1 is extended or retracted.

Figure 13B:
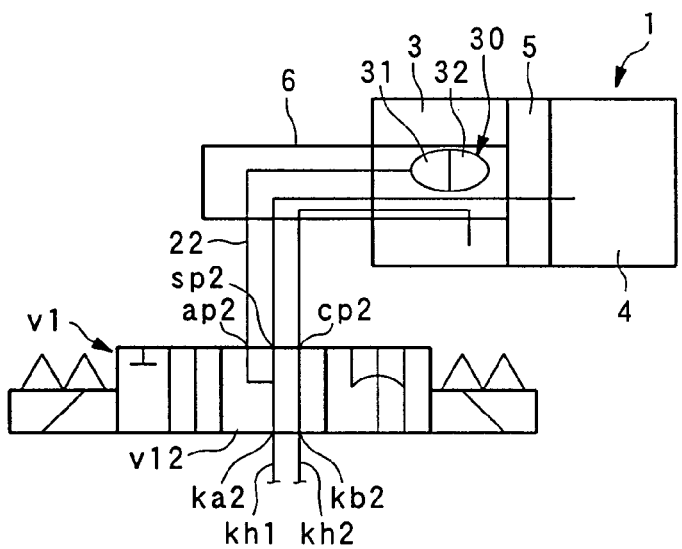

A second switching position v12 shown in FIG. 13B is a position where switching is made at the time of stopping the retracting operation after the operating oil is supplied to the first cylinder chamber 3 of the hydraulic cylinder 1 and the operating oil is discharged from the second cylinder chamber 4 to retract the hydraulic cylinder 1.

Figure 13C:
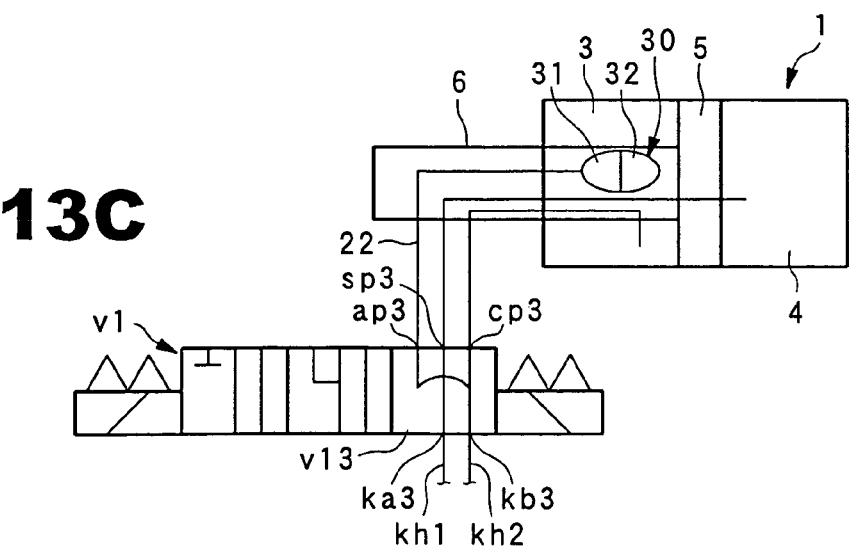

A third switching position v13 shown in FIG. 13C is a position where switching is made at the time of stopping the extending operation after the operating oil is supplied to the second cylinder chamber 4 of the hydraulic cylinder 1 and the operating oil is discharged from the first cylinder chamber 3 to extend the hydraulic cylinder 1.

Now, an operation of the hydraulic cylinder 1 of the hydraulic circuit will be described.

To retract the hydraulic cylinder 1, the direction switching valve kv is switched to a first switching position kv1 and the damping control valve v1 is switched to the first switching position v11 as shown in FIG. 11A.

In this case, the operating oil is supplied to the first cylinder chamber 3 of the hydraulic cylinder 1 and the operating oil is discharged from the second cylinder chamber 4 to retract the hydraulic cylinder 1. In this case, the connection to the accumulator 30 is blocked and the operating oil is not supplied or discharged, so that the accumulator 30 does not operate.

Figure 12A:
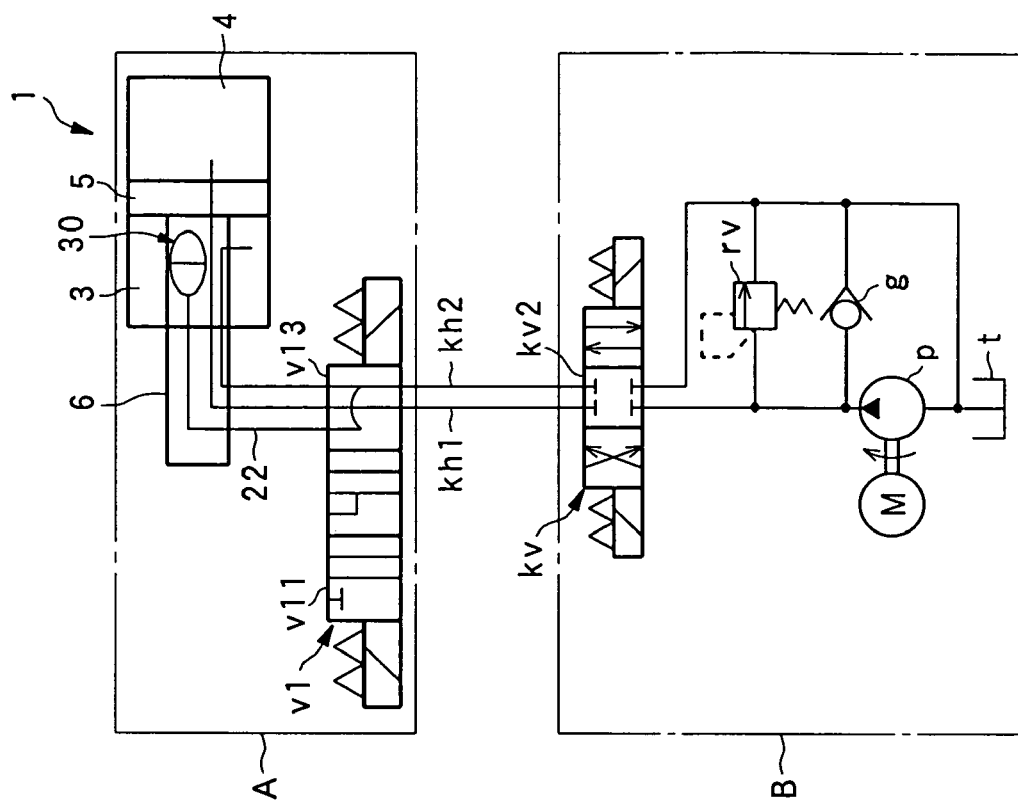
FIGS. 12A and 12B are views showing a state of stopping the retracting operation and a state of stopping the extending operation of the hydraulic cylinder in the hydraulic circuit for driving the hydraulic cylinder built in the accumulator, respectively, according to the embodiment of the present invention.

Then, the hydraulic cylinder 1 is retracted to a prescribed position so to reach the stop position, the direction switching valve kv is switched to a second switching position kv2, and the damping control valve v1 is switched to the second switching position v12 as shown in FIG. 12A.

At this time, the connection of the second supply/discharge pipe kh2 with the hydraulic motor p is blocked by the direction switching valve kv to stop the supply of the operating oil to the first cylinder chamber 3, and the connection to the tank of the first supply/discharge pipe kh1 is blocked. Thus, the discharge of the operating oil from the second cylinder chamber 4 is stopped.

The damping control valve v1 has the accumulation port ap2 and the first extension/retraction port sp2 mutually connected at the second switching position v12 as shown in FIG. 13B, the operating oil in the second cylinder chamber 4 is guided into the first cylinder rod chamber 31 of the accumulator 30.

At this time, a damping operation is performed as described above until the pressure of the operating oil guided from the second cylinder chamber 4 into the first cylinder rod chamber 31 of the accumulator 30 and the pressure of the gas 34 hermetically charged into the second cylinder rod chamber 32 of the accumulator 30 are mutually balanced with the accumulator piston 33 between them, and the damper function can be exerted. And, a shock because of stopping the retraction produced when the cylinder rod 6 is stopped after its retracting operation can be absorbed. Thus, the occurrence of a shock can be prevented.

At the same time, potential energy of the retracting operation of the hydraulic cylinder 1 can be accumulated as the pressure of the gas 34 in the second cylinder rod chamber 32 of the accumulator 30.

Figure 14A:
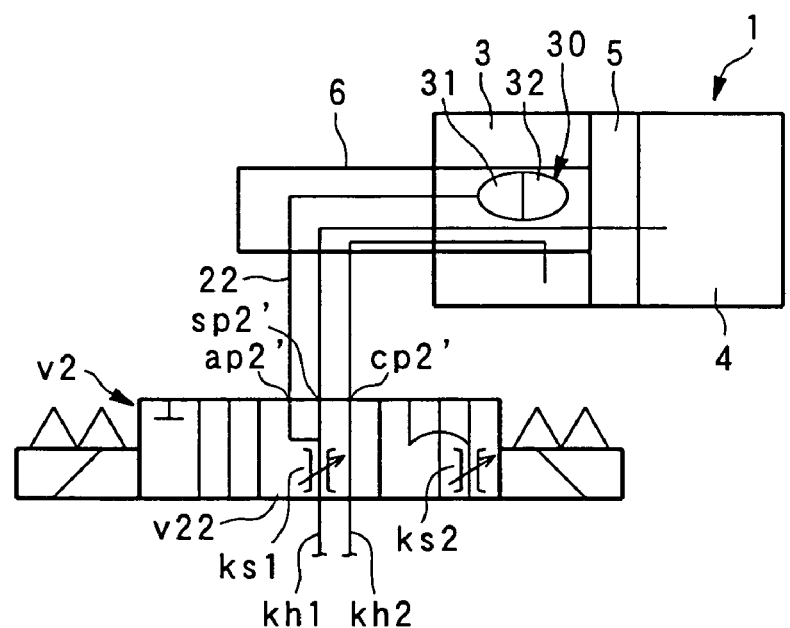
FIGS. 14A and 14B are a view showing a connected state at the time of stopping the retracting operation of the hydraulic cylinder when a damping control valve having an adjustable throttle therein instead of the damping control valve in the hydraulic circuit shown in FIGS. 13A through 12C, and a view showing a connected state at the time of stopping the extending operation, respectively.
Figure 14B:
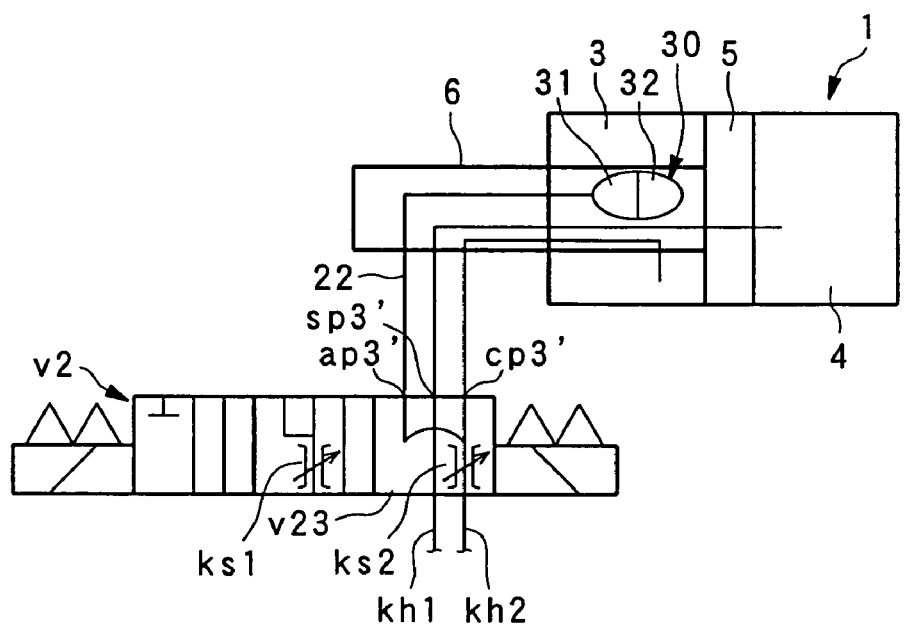

The damping control valve v1 shown in FIGS. 13A through 12C can be determined to be a damping control valve v2 incorporating adjustable throttles (first throttle means) ks1, (second throttle means) ks2 which can adjust the contraction of the cross-sectional area as shown in FIGS. 14A and 14B.

The damping control valve v2 is connected to the direction switching valve kv via the first supply/discharge pipe kh1 and the second supply/discharge pipe kh2 for supply/discharge of the operating oil.

As shown in FIG. 14A, an accumulation port ap2' and the second cylinder chamber 4 are connected to the first supply/discharge pipe kh1 via the adjustable throttle ks1 at a second switching position v22 of the damping control valve v2. As shown in FIG. 14B, an accumulator port ap3' and the first cylinder chamber 3 are connected to the second supply/discharge pipe kh2 via the adjustable throttle ks2 at a third switching position v23' of the damping control valve v2.

The damping control valve v2 is configured in the same way as the damping control valve v1 except that the damping control valve v1 has adjustable throttles ks1, ks2 therein. Therefore, the components of the damping control valve v1 are affixed "'" to their numerals, and their detailed descriptions are omitted.

Where the damping control valve v2 is adopted, the supply of the operating oil to the first cylinder chamber 3 is stopped at the second switching position v22 as shown in FIG. 14A, the discharge of the operating oil from the second cylinder chamber 4 is stopped, and at the same time, the operating oil of the second cylinder chamber 4 is guided into the first cylinder rod chamber 31 of the accumulator 30.

At this time, the operating oil discharged from the second cylinder chamber 4 flows partly to the first supply/discharge pipe kh1 via the adjustable throttle ks1, so that damping adjustment of the retracting operation of the hydraulic cylinder 1 and adjustment of accumulation of the potential energy by the retracting operation can be made by adjusting the adjustable throttle ks1.

Where the hydraulic cylinder 1 is extended, the direction switching valve kv is switched to a third switching position kv3, and the damping control valve v1 is switched to the first switching position v11 as shown in FIG. 11B.

In this case, the operating oil is supplied to the second cylinder chamber 4 of the hydraulic cylinder 1, and the operating oil is discharged from the first cylinder chamber 3 to expand the hydraulic cylinder 1. In this case, the connection to the accumulator 30 is blocked, and the operating oil is not supplied or discharged. Therefore, the accumulator 30 does not operate.

Figure 12B:
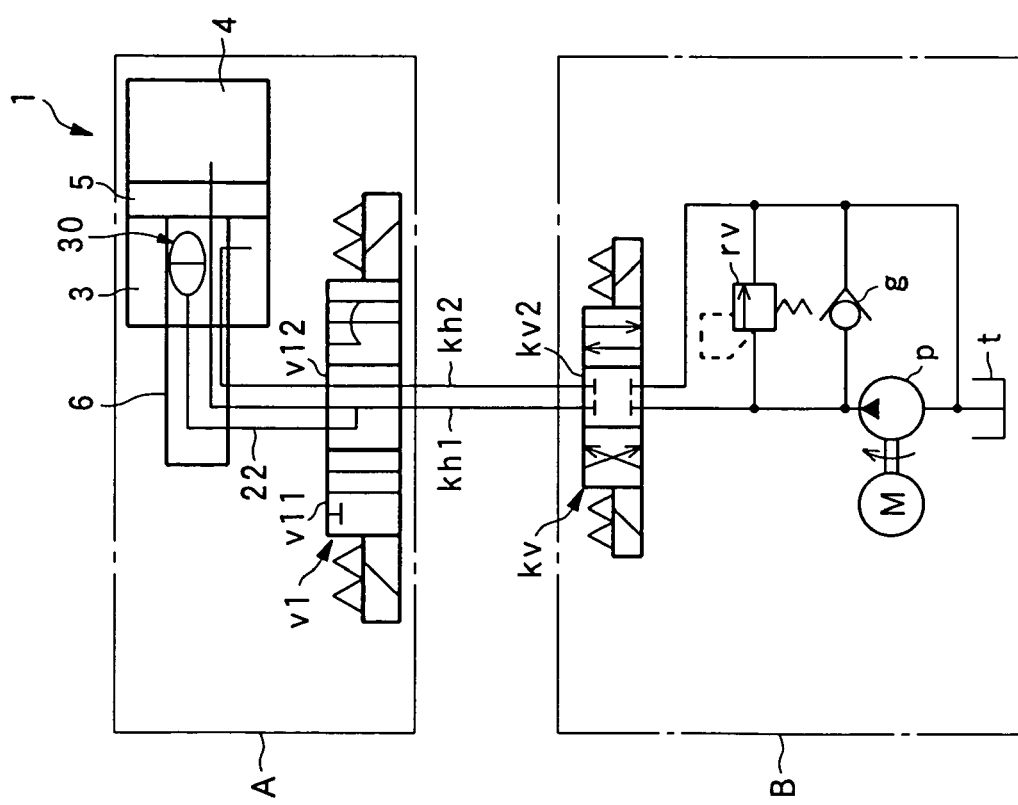

When the hydraulic cylinder 1 is extended to a prescribed position to reach the stop position, the direction switching valve kv is switched to the second switching position kv2, and the damping control valve v1 is switched to the third switching position v13 as shown in FIG. 12B.

At this time, the connection of the first supply/discharge pipe kh1 with the hydraulic motor p is blocked by the direction switching valve kv to stop the supply of the operating oil to the second cylinder chamber 4, and the connection of the second supply/discharge pipe kh2 with the tank is blocked to stop the discharge of the operating oil from the first cylinder chamber 3.

The damping control valve v1 has the accumulation port ap3 and the second extension/retraction port cp3 connected at the third switching position v13 as shown in FIG. 13C, and the operating oil in the first cylinder chamber 3 is guided into the first cylinder rod chamber 31 of the accumulator 30.

At this time, the damping motion is performed until the pressure of the operating oil guided from the first cylinder chamber 3 into the first cylinder rod chamber 31 of the accumulator 30 and the pressure of the gas 34 hermetically charged into the second cylinder rod chamber 32 of the accumulator 30 are mutually balanced with the accumulator piston 33 between them as described above, and the dumper function can be exerted. A shock because of stopping the extension produced when the cylinder rod 6 is stopped after its extending operation can be absorbed. Thus, the occurrence of a shock can be prevented.

At the same time, the potential energy of the extending operation of the hydraulic cylinder 1 can be accumulated as the pressure of the gas 34 in the second cylinder rod chamber 32 of the accumulator 30.

The dumping control valve v1 shown in FIGS. 13A through 12C can be the damping control valve v2 having adjustable throttles ks1, ks2 capable of adjusting the contraction of the cross-sectional area as shown in FIGS. 14A and 14B.

When the damping control valve v2 is adopted, the supply of the operating oil to the second cylinder chamber 4 is stopped at a third switching position v23 as shown in FIG. 14B, the discharge of the operating oil from the first cylinder chamber 3 is stopped. At the same time, the operating oil in the first cylinder chamber 3 is guided into the first cylinder rod chamber 31 of the accumulator 30.

At this time, the operating oil discharged from the first cylinder chamber 3 flows partly to the second supply/discharge pipe kh2 via the adjustable throttle ks2, so that the adjustment of the adjustable throttle ks2 allows to adjust the dumping of the extending operation of the hydraulic cylinder 1 and the accumulation of the potential energy because of the extending operation.

Thus, the use of the dumping control valve v2 allows to make the damping adjustment and accumulation adjustment by the valve of the adjustable throttles ks1, ks2.

In the above description, the hydraulic cylinder 1 was used for a crane, a bulldozer blade and the like, and dumping was applied when its operation was stopped. But, when the hydraulic cylinder 1 is desired to be operated rigid without applying damping so to stop it in a case of turning of the ground by the bucket, it is adequate that the direction switching valve kv is switched to the second switching position kv2 and the damping control valve v1 is switched to the first switching position v11 in FIGS. 12A and 12B.

According to the above-described configuration, the control valve and hydraulic circuit for driving to control the hydraulic cylinder 1 having the accumulator 30 therein are obtained, the damper function can be exhibited when the operation of the hydraulic cylinder 1 is stopped, a shock of stopping produced when the hydraulic cylinder is stopped after the operation can be absorbed, and the occurrence of the shock can be prevented.

Also, the potential energy of the operation of the hydraulic cylinder 1 can be accumulated as a pressure of the gas 34 in the second cylinder rod chamber 32 of the accumulator 30 and can be exerted as an auxiliary force at the next start of the hydraulic cylinder 1.

Specifically, the recovery and reuse of the energy can be made in the process of accumulation in the accumulator 30 and release of its energy, and energy saving can be made.

When the damping control valve v2 having the adjustable throttles ks1, ks2 capable of adjusting the contraction of the cross-sectional area is used instead of the damping control valve v1, the adjustment of the adjustable throttles ks1, ks2 allows to adjust the damping action and the accumulation effect at the time of stopping the retracting operation and stopping the extending operation of the hydraulic cylinder 1.

The direction switching valve kv is disposed at the vehicle body B, and the damping control valves v1, v2 are disposed at the working machine A as shown in FIGS. 11A and 11B and FIGS. 12A and 12B.

Therefore, a pipe distance of the first supply/discharge pipe kh1 and the second supply/discharge pipe kh2 between the direction switching valve kv and the damping control valves v1, v2 becomes long.

To retract the hydraulic cylinder 1 as described above, a high-pressure operating oil is flown through the second supply/discharge pipe kh2 to supply the first cylinder chamber 3 with the operating oil as shown in FIG. 11A, and a low-pressure operating oil is flown through the first supply/discharge pipe kh1 to discharge the operating oil from the second cylinder chamber 4.

Conversely, to expand the hydraulic cylinder 1, a high-pressure operating oil is flown through the first supply/discharge pipe kh1 to supply the second cylinder chamber 4 with the operating oil as shown in FIG. 11B, and to discharge the operating oil from the first cylinder chamber 3, a low-pressure operating oil is flown through the second supply/discharge pipe kh2.

As described above, the pressure of the operating oil flowing through the first supply/discharge pipe kh1 and the second supply/discharge pipe kh2 is exchanged between a low pressure and a high pressure depending on the operation of the hydraulic cylinder 1, so that when the first supply/discharge pipe kh1 and the second supply/discharge pipe kh2 are long, a time lag occurs when the extending operation and the retracting operation are switched between them, and a switching response might not be made quickly.

As described above, the high-pressure operating oil and the low-pressure operating oil are flown through the first supply/discharge pipe kh1 and the second supply/discharge pipe kh2 in opposite directions, respectively.

Therefore, the first supply/discharge pipe kh1 and the second supply/discharge pipe kh2 are required to be resistant to the high pressure and be long, resulting in increasing costs. It is especially disadvantageous in terms of costs when used for a large vehicle.

EMBODIMENT 2

Embodiment 2 having resolved the above-described disadvantage is shown in FIGS. 15A and 15B and FIGS. 16A and 16B.

Embodiment 2 has the direction switching valve kv' of Embodiment 1 integrated with or put closer to a damping control valve v1'.

Therefore, the damping control valve v1' and the direction switching valve kv' are disposed integral with or closer to the hydraulic cylinder 1 at the work machine A.

In this configuration, pipes ks1, ks2 for connection of the direction switching valve kv' at the work machine A and hydraulic equipment such as the hydraulic motor p at the vehicle body B are laid long.

Embodiment 2 is configured in the same way as the first embodiment except the above-described configuration, and same numerals are used to denote the same components, and their detailed descriptions are omitted.

Figure 15A:
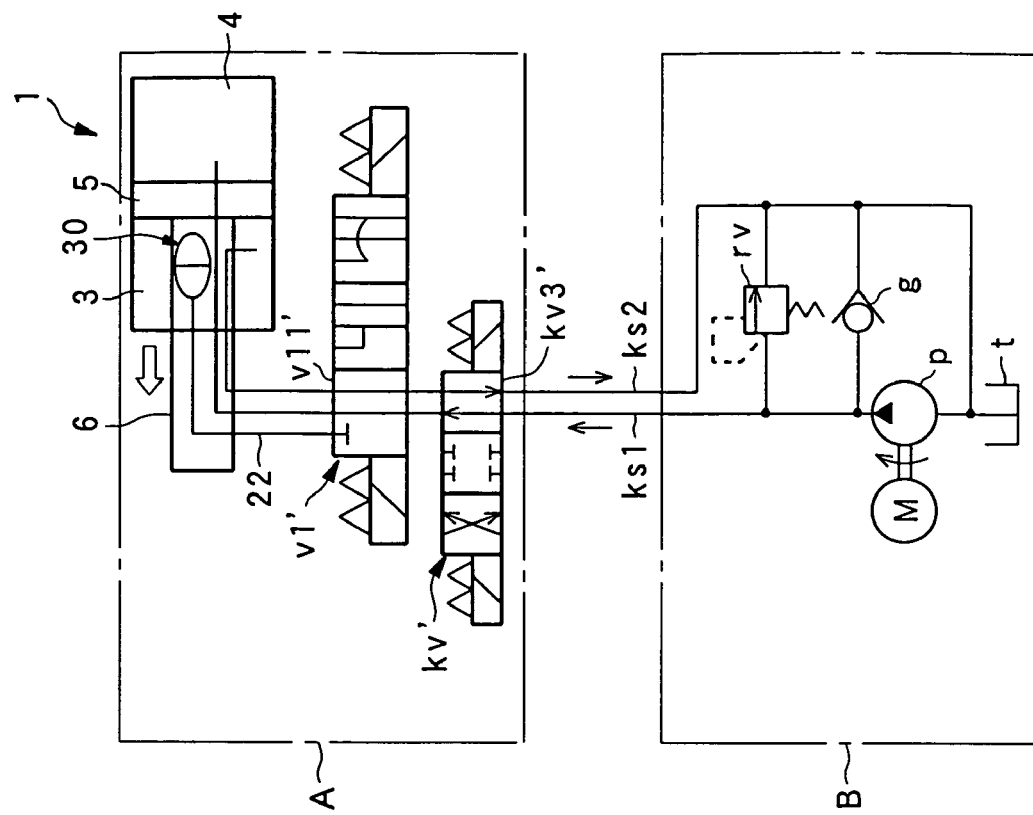
FIGS. 15A and 15B are a view showing a retracted state of the hydraulic cylinder in the hydraulic circuit for driving the hydraulic cylinder built in the accumulator according to another embodiment of the present invention and a view showing an extended state, respectively.

When the hydraulic cylinder 1 is retracted, the direction switching valve kv' is switched to a first switching position kv1' as shown in FIG. 15A, and the damping control valve v1' is switched to a first switching position v11'.

Therefore, the pipe ks1 is communicated to supply a high-pressure operating oil into the first cylinder chamber 3, and the operating oil in the second cylinder chamber 4 having a low pressure is discharged with the pipe ks2 communicated.

Figure 16B:
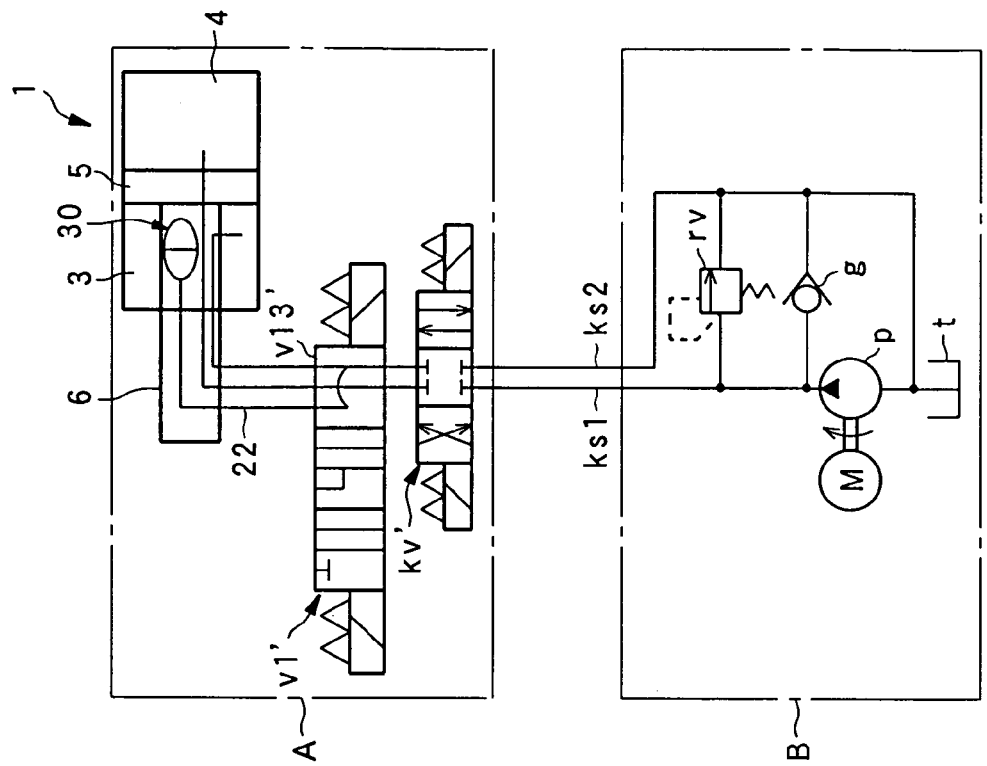
FIGS. 16A and 16B are a view showing a stopped state of the retracting operation of the hydraulic cylinder in the hydraulic circuit for driving the hydraulic cylinder built in the accumulator according to the another embodiment of the present invention, and a view showing a stopped state of the extending operation, respectively.
Figure 16A:
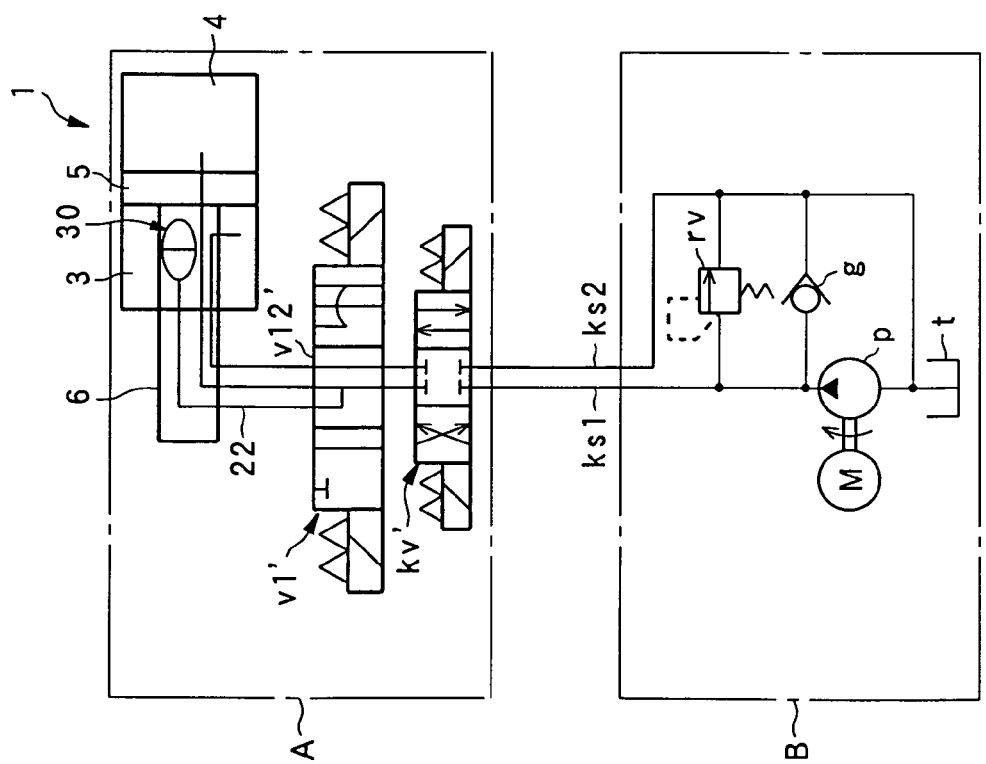

FIG. 16A shows a state that when the retracting operation is stopped, the operating oil is flown from the second cylinder chamber 4 into the accumulator 30 to perform a damping action.

Figure 15B:
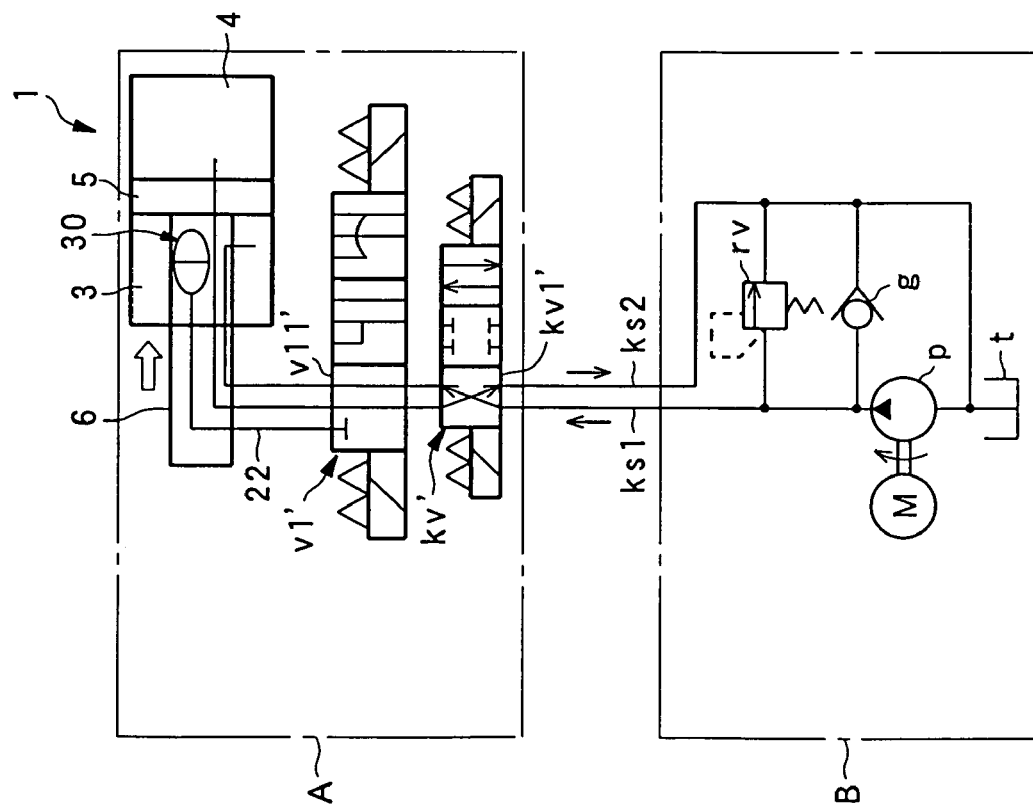

When the hydraulic cylinder 1 is extended, the direction switching valve kv' is switched to a third switching position kv3' as shown in FIG. 15B, and the damping control valve v1' is switched to the first switching position v11'.

The pipe ks1 is communicated to supply the high-pressure operating oil to the second cylinder chamber 4, and the operating oil in the first cylinder chamber 3 having a low pressure is discharged with the pipe ks2 communicated.

FIG. 16B shows that a damping action is performed by flowing the operating oil in the first cylinder chamber 3 to the accumulator 30 to stop the extending operation.

By configuring as described above, the direction switching valve kv' and the damping control valve v1' are disposed integral with or close to each other. Therefore, the distance between the direction switching valve kv' and the damping control valve v1' is short, so that the pipe can be made short as much as possible. Thus, switching from the high pressure to the low pressure and vice versa of the operating oil in the pipe at the time of supply and discharge can be made smoothly.

Therefore, switching from the extending operation to the retracting operation and vice versa of the hydraulic cylinder 1 can be performed smoothly and quickly, and an operation switching response of the hydraulic cylinder 1 is improved.

As described above, the high-pressure operating oil keeps flowing in the direction of the arrow through the pipe ks1 at the time of the retracting operation shown in FIG. 15A and the extending operation shown in FIG. 15B of the hydraulic cylinder 1, and the low-pressure operating oil flows in the direction of the arrow through the pipe ks2.

Therefore, to the pipes ks1, ks2 connecting the hydraulic equipment at the work machine A and the hydraulic equipment at the vehicle body B can be distinguished as a high-pressure pipe and a low-pressure pipe. And, the flowing direction of the operating oil can be determined to a prescribed direction. Thus, the design of the pipes ks1, ks2 can be optimized.

It is needless to say that the damping control valve v1' can be replaced with the above-described damping control valve v2 having the adjustable throttles ks1, ks2 capable of adjusting the contraction of the cross-sectional area (see FIGS. 14A and 14B).

In this case, where the damping control valve v2 having the adjustable throttles ks1, ks2 therein is used, the adjustment of the adjustable throttles ks1, ks2 allows the adjustment of the damping operation and the adjustment of the accumulation effect when the retracting operation and the extending operation of the hydraulic cylinder 1 are stopped.

In the above-described embodiment, the direction switching valves kv, kv' and the damping control valves v1, v1', v2 are assumed to be solenoid valves but may be any valves such as a hydraulic valve for a pilot pressure, other types of valves.

As described above, the present invention provides an optimum circuit for a hydraulic cylinder which can conduct as desired the execution and stop of a shock absorbing function of an accumulator disposed within a cylinder rod, so that it can be applied to various types of machines including construction machines such as cranes and bulldozers and machine tools such as presses, if they use the hydraulic cylinder.

What is claimed is:

1. A hydraulic circuit for a hydraulic cylinder, wherein the hydraulic cylinder comprises a first cylinder chamber to which an operating oil is supplied during a retracting operation; a second cylinder chamber to which an operating oil is supplied during an extending operation; an accumulator comprising an accumulator piston which is inserted into a cylinder rod and divides an interior of the cylinder rod into first and second cylinder rod chambers, and a gas which is hermetically charged into the second cylinder rod chamber; and an accumulation port which supplies and discharges an operating oil to and from the first cylinder rod chamber of the accumulator, the hydraulic circuit comprising a damping control valve having:
a first switching position in which connection of the accumulation port with outside is blocked, and supply and discharge or discharge and supply of the operating oil are performed for the first cylinder chamber and the second cylinder chamber,
a second switching position in which at least the accumulation port and the second cylinder chamber are connected, and
a third switching position in which at least the accumulation port and the first cylinder chamber are connected.

2. The hydraulic circuit for a hydraulic cylinder according to claim 1, wherein the damping control valve is disposed integral with or close to the hydraulic cylinder.

3. The hydraulic circuit for a hydraulic cylinder according to claim 2, further comprising a direction switching valve having a first switching position in which the operating oil is supplied to the first cylinder chamber and the operating oil is discharged from the second cylinder chamber, a second switching position in which supply/discharge of the operating oil for the first cylinder chamber and the second cylinder chamber is stopped, and a third switching position in which the operating oil is supplied to the second cylinder chamber and the operating oil is discharged from the first cylinder chamber, the direction switching valve being disposed integral with or close to the damping control valve.

4. The hydraulic circuit for a hydraulic cylinder according to claim 2, wherein:
the damping control valve is connected to the direction switching valve via a first supply/discharge pipe and a second supply/discharge pipe for supplying and discharging the operating oil;
the accumulation port and the second cylinder chamber are connected to the first supply/discharge pipe at the second switching position of the damping control valve via a first throttle means; and
the accumulation port and the first cylinder chamber are connected to the second supply/discharge pipe at the third switching position of the damping control valve via a second throttle means.

5. The hydraulic circuit for a hydraulic cylinder according to claim 1, further comprising a direction switching valve having a first switching position in which the operating oil is supplied to the first cylinder chamber and the operating oil is discharged from the second cylinder chamber, a second switching position in which supply/discharge of the operating oil for the first cylinder chamber and the second cylinder chamber is stopped, and a third switching position in which the operating oil is supplied to the second cylinder chamber and the operating oil is discharged from the first cylinder chamber, the direction switching valve being disposed integral with or close to the damping control valve.

6. The hydraulic circuit for a hydraulic cylinder according to claim 5, wherein:
the damping control valve is connected to the direction switching valve via a first supply/discharge pipe and a second supply/discharge pipe for supplying and discharging the operating oil;
the accumulation port and the second cylinder chamber are connected to the first supply/discharge pipe at the second switching position of the damping control valve via a first throttle means; and
the accumulation port and the first cylinder chamber are connected to the second supply/discharge pipe at the third switching position of the damping control valve via a second throttle means.

7. The hydraulic circuit for a hydraulic cylinder according to claim 1, wherein:
the damping control valve is connected to the direction switching valve via a first supply/discharge pipe and a second supply/discharge pipe for supplying and discharging the operating oil;
the accumulation port and the second cylinder chamber are connected to the first supply/discharge pipe at the second switching position of the damping control valve via a first throttle means; and
the accumulation port and the first cylinder chamber are connected to the second supply/discharge pipe at the third switching position of the damping control valve via a second throttle means.

8. A damping control valve for driving and controlling a hydraulic cylinder, wherein the hydraulic cylinder comprises a first cylinder chamber to which an operating oil is supplied during a retracting operation; a second cylinder chamber to which an operating oil is supplied during an extending operation; an accumulator comprising an accumulator piston which is inserted into a cylinder rod and divides an interior of the cylinder rod into first and second cylinder rod chambers, and a gas which is hermetically charged into the second cylinder rod chamber; and an accumulation port which supplies and discharges an operating oil to and from the first cylinder rod chamber of the accumulator,
the damping control valve having:
a first switching position in which connection of the accumulation port with outside is blocked, and supply and discharge or discharge and supply of the operating oil are performed for the first cylinder chamber and the second cylinder chamber,
a second switching position in which at least the accumulation port and the second cylinder chamber are connected, and
a third switching position in which at least the accumulation port and the first cylinder chamber are connected.

9. A damping control valve according to claim 8, further comprising:
a first supply/discharge pipe and a second supply/discharge pipe for supplying and discharging the operating oil that are connected to the damping control valve, wherein
the accumulation port and the second cylinder chamber are connected to the first supply/discharge pipe at the second switching position of the damping control valve via a first throttle means; and
the accumulation port and the first cylinder chamber are connected to the second supply/discharge pipe at the third switching position of the damping control valve via a second throttle means.

* * * * *